Oct. 3 1967 M. AVRIL ETAL 3,345,616
DEVICES FOR ANALYZING PHYSICAL PHENOMENONS, AND
IN PARTICULAR NUCLEAR PHENOMENONS
Filed Jan. 14, 1964 7 Sheets-Sheet 1

INVENTORS
MICHEL AVRIL
RAYMOND MOREAU
ALIX PAGES
BY

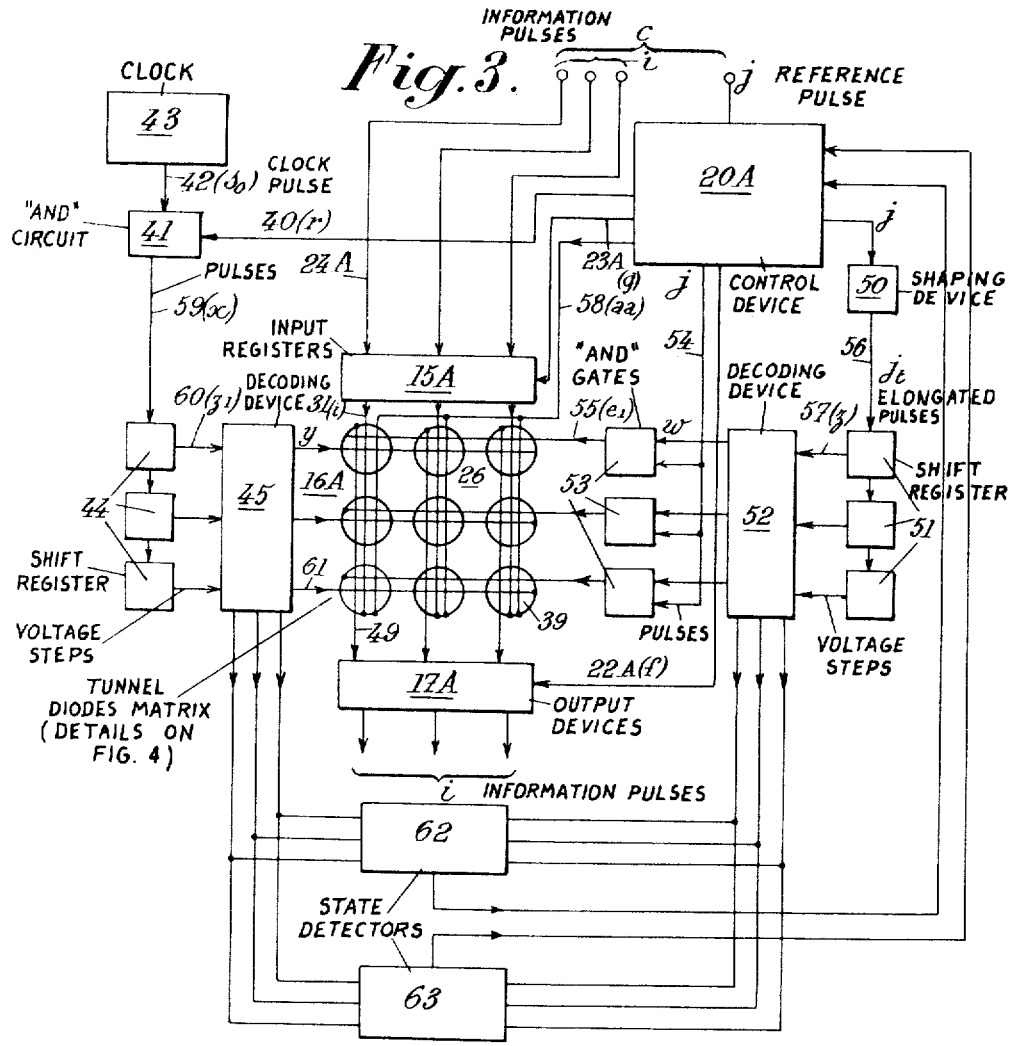
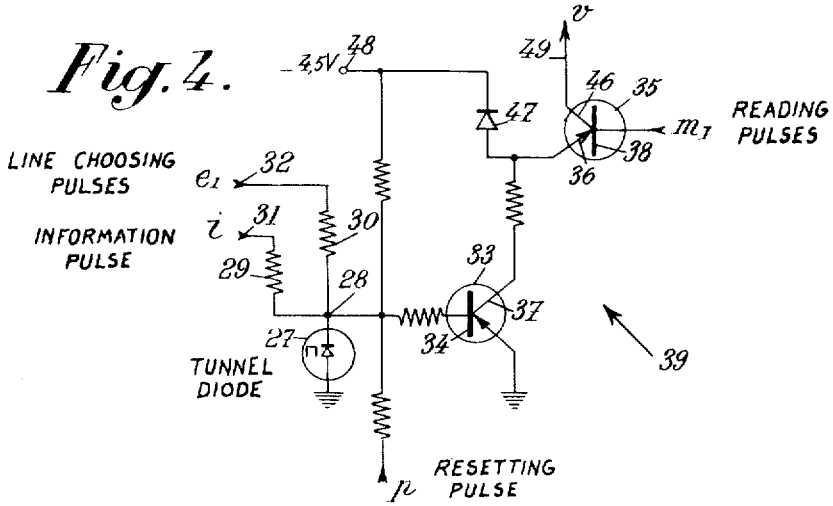

Fig. 5.

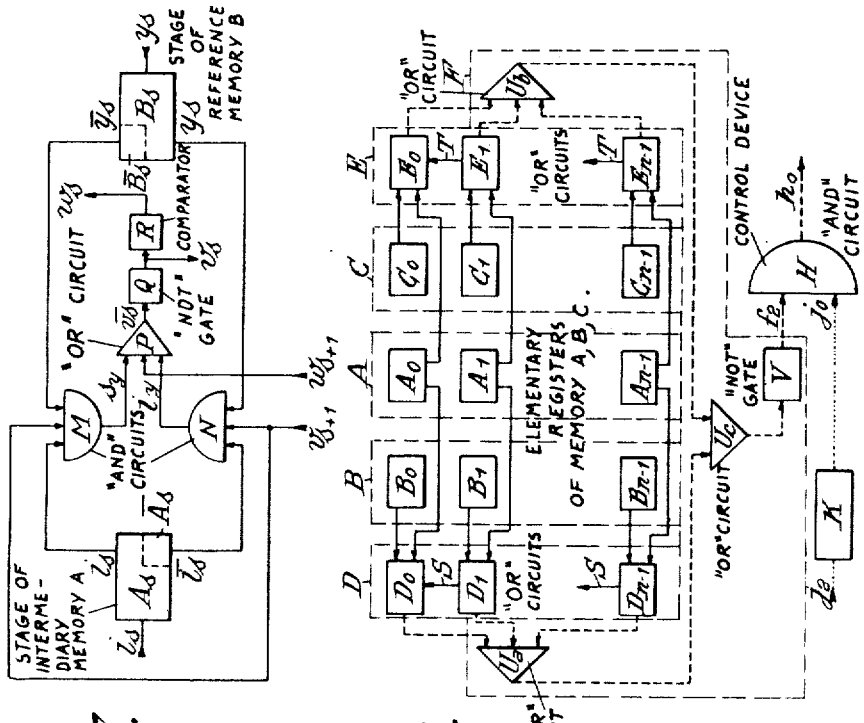
Fig. 7.
Fig. 8.
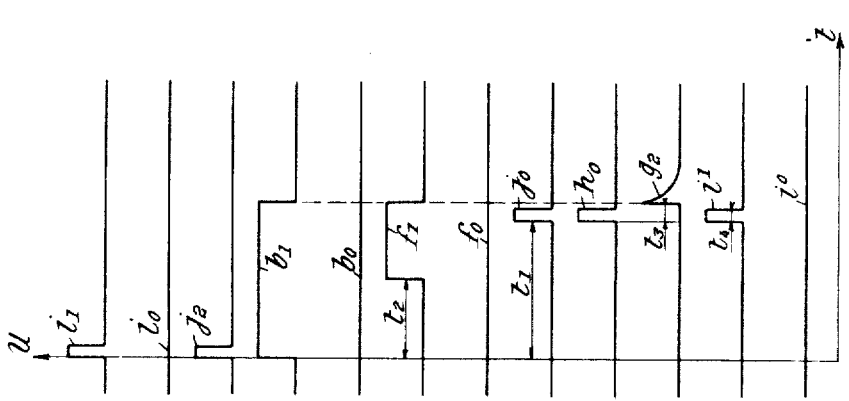
Fig. 6.

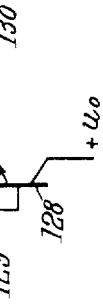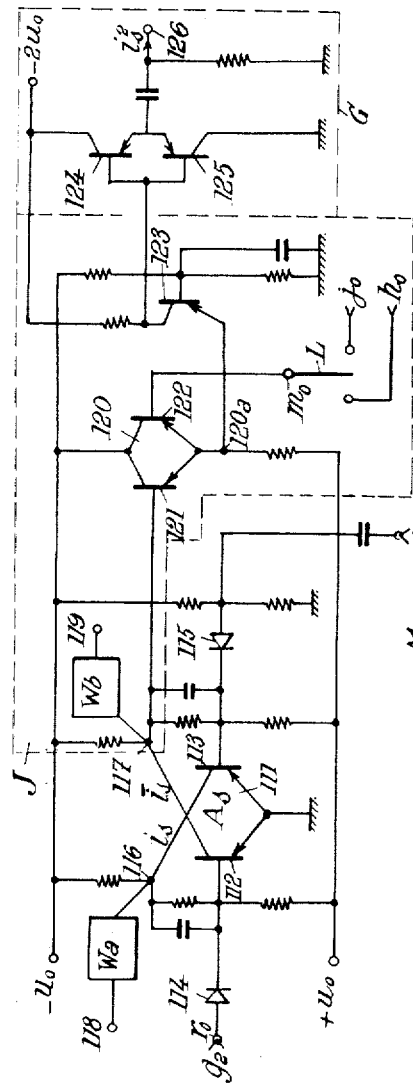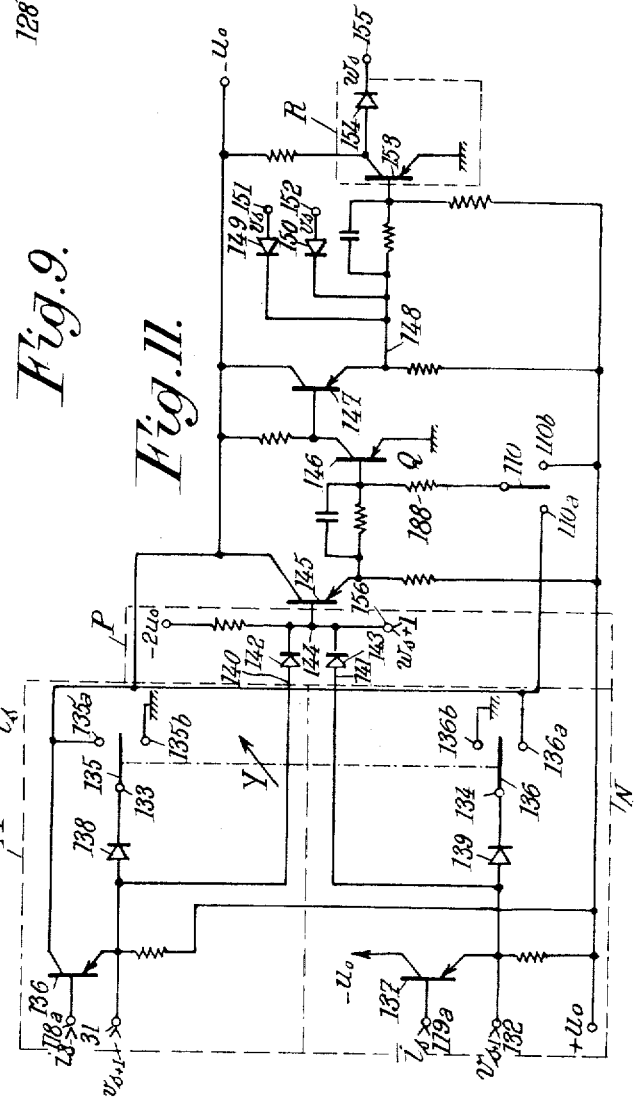

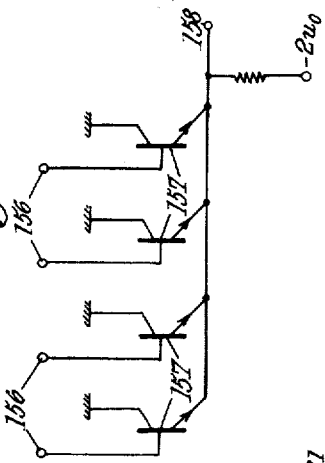
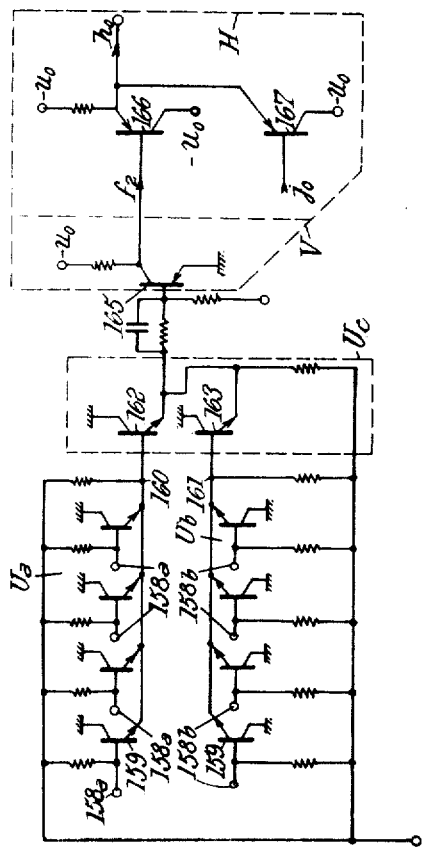
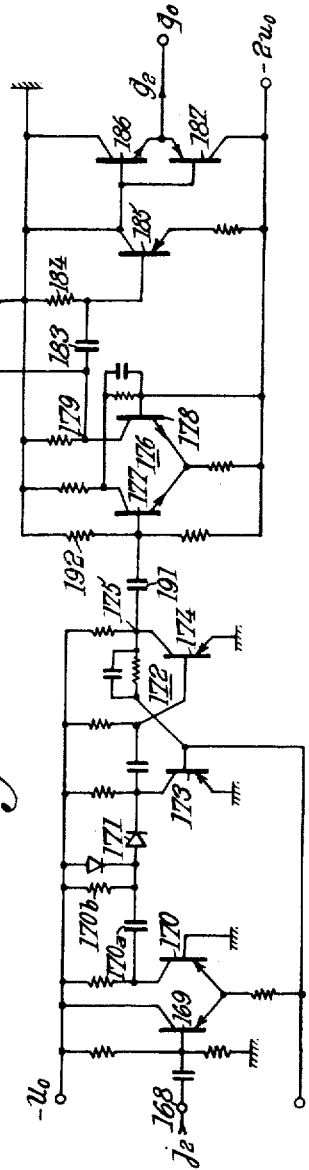

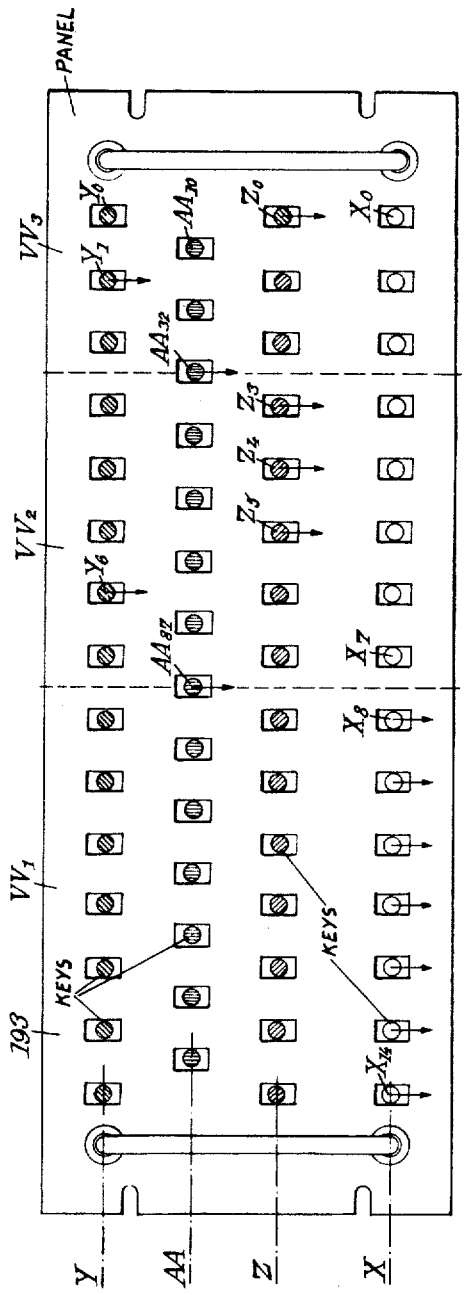

United States Patent Office

3,345,616
Patented Oct. 3, 1967

3,345,616
DEVICES FOR ANALYZING PHYSICAL PHENOMENONS, AND IN PARTICULAR NUCLEAR PHENOMENONS
Michel Avril, Gif-sur-Yvette, Raymond Moreau, Yveline, and Alix Pages, Gif-sur-Yvette, France, assignors to Commissariat à l'Energie Atomique, Paris, France, a French organization
Filed Jan. 14, 1964, Ser. No. 337,690
Claims priority, application France, Jan. 15, 1963, 921,492, 921,494
8 Claims. (Cl. 340—172.5)

The present invention relates to devices for analyzing physical phenomenons, that is to say to devices which make it possible to record, to classify and to treat the results of experiments in physics, generally bringing into play several variables. It is more particularly concerned with analyzers for nuclear phenomenons, such as nuclear reactions, bringing into play a great number of variables (energizes, times of occurrence and directions of several particles, and so on) transmitted into electrical pulses by radiation detectors.

The chief object of our invention is to provide analyzers having great possibilities of use (possibility of working as multichannel analyzers or multidimensional analyzers), an easy adaptation to various experiments (by changing some sub-units), a great reliability and very wide possibilities of analyzing.

The invention has for its object a device for analyzing physical phenomenons consisting of several removable sub-units, each performing a given function of treating information in the sequence of the successive functions or operations to be effected for analyzing said phenomenons, to wit, in particular:

An input sub-unit or analyzing sub-unit deducing from the succession of the elementary phenomenons that occur at irregular intervals a succession of groups of, at most, $n+1$ simultaneous electrical pulses representing, for every group, both a number comprising $n$ digits, at the most (which number, in a pure, parallel, binary code, designates the elementary information corresponding to an elementary phenomenon), and a reference supplementary digit associated with said number, A timing, or derandomising, sub-unit distributing at regular time intervals the succession of groups of pulses that issue from said analyzing sub-unit and which are generally distributed at irregular intervals, One or several storing, treating and/or conditioning sub-units of groups of pulses issuing from the last mentioned unit and distributed at regular intervals, and An output sub-unit for exploiting the results which stores up and/or displays the elaborated informations concerning said physical phenomenons and resulting from the storing, treating and/or conditioning of the groups of pulses in the storing, treating and/or conditioning sub-units.

The analyzer device according to the invention may further bring into play one or several of the following characteristics:

(1) The analyzer device comprises several sub-units each comprising (with the exception of the input and output sub-units) in order to permit transmission of the groups of pulses from one sub-unit to another one, in combination:

$n$ input registers for temporarily storing the $n$ pulses of a group representing the number designating every elementary information to be treated in the sub-unit, One or several functional units capable of performing, on these $n$ information pulses, the functions corresponding to said sub-units.

$n$ output units, each comprising a gate circuit and an impedance transforming circuit, and A pilot unit capable—in response to a reference pulse, which represents the reference digit and which comes thereto from the upstream sub-unit at the same time as the $n$ associated information pulses reach the $n$ registers from said upstream sub-unit—of controlling the operation of said functional units, of releasing the gate circuit in order to permit transmission to the downstream sub-unit of the group of information pulses, of transmitting toward this downstream sub-unit a reference pulse in synchronism with said group of pulses, and in resetting to zero the $n$ registers at the end of the treatment, in the sub-unit in question, of the information pulses, in order to enable the last mentioned sub-unit to take into charge a new group of information pulses;

(2) The analyzer device comprises a timing sub-unit intended to distribute, at regular time intervals, the elementary informations which are supplied thereto in a random manner in the form of groups of $n$ binary digits (or bits) the damping effect having the possibility of acting upon a number of groups up to $a$, said timing sub-unit being characterized by the combination of the following elements:

A matrix of tunnel diodes each of which can be attacked at its input, through two resistors, by two half-currents (every tunnel diode does not switch over if it is attacked by a single half-current, switches over from a first state called "zero" state to a second state called "one" state if it is attacked simultaneously by two half-currents), the tunnel diodes being grouped to form $a$ rows comprising each $n$ tunnel diodes, the first half-input of a tunnel diode of every row being connected to receive one of the $n$ digits of a group, whereas the second half-inputs of the $n$ tunnel diodes of a row are connected in shunt so as to be able, simultaneously to receive a pilot pulse which chooses a free row, A first series of transistors comprising a number $a$ times $n$ of transistors each of which is either conductive or blocked according as the tunnel diode to which it is associated is either in state "one" or in state "zero" respectively, the basis of every transistor of this first series being connected with the input of the tunnel diode associated therewith, and A second series of transistors comprising a number $a$ times $n$ of transistors, the emitter of a transistor of the second series being connected to the collector of a transistor of the first series, whereas the basis of the transistors of the second series is connected to receive the reading pulses, the "zero" resetting pulses of the tunnel diodes of the row being applied, after the reading pulses of the same row, to the input of every tunnel diode of this row;

(3) The analyzer device comprises a quick conditioning unit comprising an input intermediate memory intended to receive, preferably at equal time intervals, and to store up in the coded form, the successive informations or magnitudes to be treated, that is to say to be checked up to ascertain whether they comply or not with at least one condition, at least one reference memory intended to receive and to store up, also in coded form, at least one limit condition, a comparator device capable of comparing the coded information contained in the intermediate memory with at least one coded limit condition, contained in the reference memory or memories, and to supply a given output signal if this comparison is conform, and an output circuit capable of transferring to another unit the coded information contained in the intermediate memory, said conditioning unit being characterized by the fact that it further comprises a conditioning gate controlling the output of the comparator device, a system of authorization gates controlling the output of the intermediate memory, these authorization gates being adapted to receive on their control input the output of said conditioning gate and a pilot device which receives a succession of reference signals, synchronized with the coded informations and therefore preferably regularly distributed in time, and which deliver, in response to every reference signal, on the one hand, to a first output connected to the control input of said conditioning gate, a released pulse delayed with respect to this reference signal by a time greater than the maximum duration necessary to the comparator device for performing a complete comparison operation, this pulse serving to release said conditioning gate to enable it to transmit the output signal that may issue from the comparator device, which signal is normally applied to said system of authorization gates to release it in order to permit transfer of the coded information contained in the intermediate memory to the output circuit, release of this system of authorization gates being in some cases ensured directly by a release pulse, and, on the other hand, to a second output connected to a zero resetting input of the intermediate memory, a zero resetting pulse delayed, with respect to the corresponding release pulse, by a duration greater than the duration of transfer of the coded information contained in the intermediate memory of the input circuit.

The invention is more especially concerned with multi-dimensional analyzer devices, also adapted to operate as multi-channel analyzers, in order to analyze nuclear reactions wherein a great number of variables are brought into play.

Preferred embodiments of the present invention will be hereinafter described with reference to the appended drawings, given merely by way of example, and in which:

FIG. 1 is a block diagram illustrating a device for analyzing physical phenomenons, this device being made according to the present invention;

FIG. 2 shows, also in the form of a block diagram, the structure of a sub-unit of the analyzer device of FIG. 1;

FIG. 3 diagrammatically illustrates the timing sub-unit of the analyzer device of FIG. 1 according to the invention;

FIG. 4 shows a detail of the sub-unit of FIG. 3, to wit one of the tunnel diodes of the timing sub-unit, with the transistors and the control circuits associated therewith;

Figure 5:
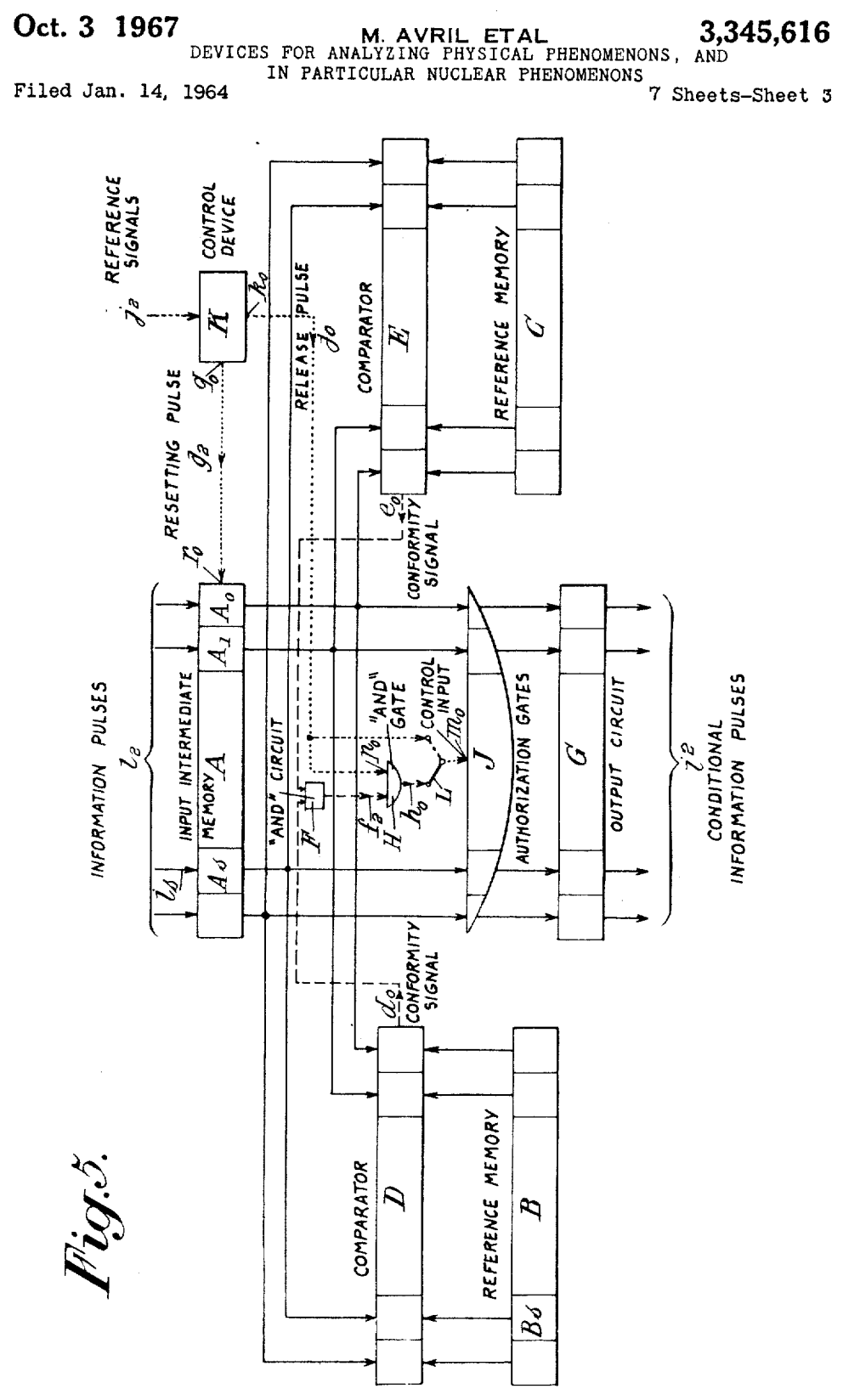

FIG. 5 diagrammatically illustrates, in the form of a block diagram, a conditioning unit adapted to be used in an analyzer device according to the invention;

FIG. 6 shows the shape of some pulses brought into play during the operation of the conditioning unit of FIG. 5;

FIG. 7 is a block diagram illustrating a comparator stage used in the conditioning unit of FIG. 5;

FIG. 8 is a block diagram view illustrating the comparator device and the gate controlling the output of this device, the whole belonging to the conditioning unit of FIG. 5;

FIGS. 9 to 14 inclusive are detailed views illustrating the different portions of a preferred embodiment of a conditioning unit according to FIGS. 5, 7 and 8, wherein, respectively:

FIG. 9 shows the input intermediate memory and the output circuit for a stage;

FIG. 10 shows an arrangement brought into play at the output of the intermediate memory of FIG. 9 toward the associated stage of the comparator device;

FIG. 11 shows a stage of the comparator device;

FIGS. 12 and 13 show a gate controlling the output of the comparator stages; and FIG. 14 shows the pilot device;

FIG. 15 is a view of the front panel of the conditioning unit of FIG. 5.

The device according to the present invention comprises (FIG. 1):

An input sub-unit or analyzing sub-unit 1 deducing, from the succession of elementary phenomenons $b$ generally occurring at irregular intervals, a succession of groups $c$ of, at most, $n+1$ simultaneous electrical pulses representing, for every group, both a number including at most $n$ digits (which number, in a parallel pure binary code, designates the elementary information corresponding to an elementary phenomenon $b$) and a reference supplementary digit associated with said number (every group therefore comprises $n$ information pulses $i$ and a reference or pilot pulse $j$, which are supplied in parallel, that is to say in synchronism, by the input sub-unit 1 and are transmitted through $n+1$ conductors grouped in a connection cable 2);

A timing sub-unit 3 distributing at regular time intervals the succession of groups $c$ of pulses which reach said analyzing sub-unit 1 through cable 2 and which generally occur at irregular time intervals, whereby sub-unit 3 periodically delivers, through a connection cable 4, including $n+1$ conductors, groups $d$ each comprising $n+1$ synchronous pulses;

One or several sub-units, such as 5, 6, 7, for storing, treating and/or conditioning groups $d$ of pulses, distributed at equal time intervals, coming from the timing sub-unit 3 through cable 4; and An output sub-unit 8 which stores up and/or displays the elaborated informations concerning said physical phenomenons and resulting from the storing, treating and/or conditioning of the groups of pulses $d$ in the storing, treating and/or conditioning sub-units 5, 6 and 7.

Before examining the preferred construction of these sub-units (with the exception of the input sub-unit 1 and of the output sub-unit 8), we will give some indications concerning the structure and function of each of the sub-units 1, 3, 5, 6, 7 and 8.

The analyzing sub-unit 1 depends upon the kind of experiment to be analyzed. It may include either one or several units, of known type, transforming a physical magnitude $b$ (for instance an intensity or an energy of a nuclear radiation, an angle, a time, a duration) into an electrical magnitude (generally an electrical voltage) the amplitude of which depends upon the value of said physical magnitude, and a unit (or several units, generally mounted in shunt) for conversion of analog magnitudes into numerical or digital magnitudes, transforming the amplitude of an electrical magnitude (representing a physical magnitude $b$) into a group of pulses $i$ corresponding, in the pure binary system, to a number which represents, for a given unit, the amplitude of the electrical magnitude. This binary number of $n$ digits or this group $i$ of at most $n$ pulses (a pulse representing figure "one" and the absence of a pulse figure "zero") is analyzed in the other sub-units of the analyzer device of FIG. 1, in the parallel system, the $n$ binary digits or bits being transmitted through $n$ conductors and treated, in each of said sub-units, in $n$ elementary identical units mounted in parallel. The analyzing sub-unit 1 may be provided, according as the analyzer device works as a multidimensional or multi-channel system, to perform either the analysis of several events (account being taken only of the events or variables to be considered), or the analysis of a single event by means of a single unit for the transformation of a physical magnitude to be measured into an electrical magnitude (for instance a scintillation detector with a photomultiplier) and a single unit for the conversion from the analog system into the digital or numerical system (amplitude comparator for instance). It has not been deemed necessary to describe particular embodiments of transformation units brought into play in view of the fact that these units depend upon the physical magnitudes to be analyzed and that they were known to some one skilled in the art. However, it will be noted that sub-unit 1 generally comprises registers or the like for storing up the $n$ bits and associated output circuits. In response to a transfer order, the state of these registers is examined and a pulse (among the $n$ pulses $i$ that are possible) is produced at the output of the circuit associated to every register if bit 1 is stored up. At the same time as the output in the binary code, that is to say in the form of at most $n$ pulses $i$, is transmitted through $n$ conductors of cable 2, the transfer order is sent through the last of the $n+1$ conductors of this cable to constitute the reference or pilot pulse $j$ (the whole of the pulses $i$ and $j$ constitutes group $c$). The presence of pulse $j$, when there is no pulse $i$, represents number "zero" which is thus differentiated from the absence of information.

The timing sub-unit 3 advantageously consists of a memory adapted to store up a given number $a$ of groups $c$ of pulses arriving thereto in a random time succession (according to the random appearance of the physical phenomenons to be determined), said memory being adapted to be interrogated at regular intervals for periodically retransmitting the groups stored therein as groups $d$ distributed at regular intervals. Such a sub-unit 3 permits of increasing the output and safety of the analyzer device while considerably reducing the time of resolution of the whole. A preferred embodiment of a timing sub-unit according to the invention will be hereafter described with reference to FIGS. 3 and 4.

The storing, treating and/or conditioning sub-units for the groups $d$ of pulses may be of various types and their number may vary according to the kind of analysis to be performed on the physical phenomenons that are studied. In a particular embodiment of the invention, these sub-units may comprise:

A storing sub-unit or non-integrating memory 5, which registers or stores up, without integrating them, the different groups $d$ of digits, that is to say the different informations coded in pure parallel binary code, and delivers them (without having exerted any treatment thereon) preferably at a much higher time rate; such a memory may advantageously consist of a device for effecting a recording on a magnetic tape by the phase modulation method and for reading this recording, for instance by a device of the type described in the patent application Ser. No. 337,686 filed Jan. 14, 1964 by the applicants for "Improvements in devices for recording information on a magnetic support, in particular on a multitrack magnetic tape, and for reading the information thus recorded";

A conditioning sub-unit 7, which checks up whether the groups of pulses $d$ that reach it, either directly from the timing sub-unit through connection cable 9 (having $n+1$ conductors) or after storing for a certain time in sub-unit 5 through connecting cable 10 (having $n+1$ conductors), comply with one or several conditions that have been imposed (in particular if the pure binary number represented by group $d$ is lower than and/or higher than one or two given numbers) and which delivers, at its output, group $d$, as constituting group $d_0$, only if the condition, or conditions, that have been imposed is, or are, complied with; a preferred embodiment of such a conditioning sub-unit is described hereinafter with reference to FIGS. 5 to 15;

A treatment or calculation sub-unit 6 which generally operates in cooperation with conditioning sub-unit 7 (to which it is connected through cables 11, 12, including $n+1$ conductors) and which comprises elements well known to anyone skilled in the art, capable of performing given operations on the numbers represented in binary code; for instance, sub-unit 6 may comprise one or several adding and subtracting devices of the parallel type, one or several quick multiplying devices of the parallel type, and/or one or several registers and conditioned output circuits; these registers and circuits, which permit of storing up, when necessary, binary numbers during their treatment in unit 6 or unit 7, may be easily reset to zero after a time T, in which case they do not deliver anything, or, on the contrary, they may receive, from other calculation elements, during a time shorter than T, the order of delivering the binary number stored up in the register; the calculating sub-unit permits of performing a number of algebraic or logical operations, or informations, or portions of information, which are not integrated (due to the fact that memory 5 is a non-integrating memory), which is very advantageous, because, once the informations have been integrated, it is practically no longer possible to go back to the non-integrated informations for treating them in a manner which seems to be interesting.

The output sub-unit 8, or sub-unit for making use of the results, generally has two functions, to wit; an integration function (the sub-unit therefore comprises an integrating memory $8_1$) and a displaying function (and for this purpose the sub-unit comprises display means $8_2$). This output sub-unit receives from conditioning sub-unit 7, through connection cable 13 (having $n+1$ conductors), the groups $d_0$ of pulses representing binary numbers or groups of pulses $d$ having complied with the conditions that have been imposed, or, through the similar cable 14, pulses $d$ directly from sub-unit 3 or sub-unit 5. Sub-unit 8 comprises, in a preferred embodiment, an integrating memory $8_1$ with magnetic toroidal elements comprising a plurality of addresses or locations, for instace 1024 or 4096, the capacity by address being advantageously of 100,000 events, followed by a display element $8_2$ or by several display elements of different types. As display element or elements, we may use one or several of the following elements:

A cathode ray tube which makes visible the curve representing the number of events corresponding to a given channel or address (number plotted in ordinates) as a function of the address or number of the channel (plotted in abscissas);

A unit delivering an analog voltage proportional to the number stored up in a given channel, which voltage may be applied to a curve tracer inscribing a curve the abscissas and ordinates of which are the same as in the cathode ray representation;

An international code tape perforator which inscribes on a tape, by means of perforations, the numbers integrated in every channel, which tape may be used in a tabulating device to supply exact results or to transfer results of integration to a calculating machine capable of performing the desired calculations on the final spectrum of the number of events as a function of the address.

In addition to the sub-units which have just been cited, an analyzer device according to the present invention may include a plurality of connecting auxiliary units, in particular one or several of the following units (not shown):

A digital or numeric switch, capable of cooperating with the analyzing sub-unit (or incorporated therein) to translate into the pure parallel binary code the informations obtained at the output of several devices (mounted in parallel) transforming the physical magnitudes to be analyzed into electrical magnitudes;

A device for converting $n-1$ digits into $2(n-1)$ digits, which permits of utilizing the analyzer device of FIG. 1 for informations requiring a number of digits ranging from $n+1$ to $n(n-1)$, including the limits, by a conversion from the sequential parallel system into the parallel system, the device according to the present invention then working with a succession of pairs of groups of $n-1$ digits, every pair of groups representing in this case a single binary number or a single elementary information;

Translation switches making it possible to give any digital channel any "weight" or binary order so that it is possible to bring into correspondence "weight by weight" inside a total given information, fractions of said information disposed "side by side" during their transfer into some sub-units, in particular into the timing sub-unit 3 and the storing sub-unit 5; thus, by means of a manual or electronic switching, it is possible to utilize the reference digit or pulse (transmitted by the last of the $n+1$ conductors of a connection cable) as translation signal for an information with respect to the $n$ conventional "weight" conductors transmitting the $n$ information pulses of the group. For instance, it is possible to send to a block for exploiting the results having a capacity of 1023 addresses (that is to say of 10 digits) informations of a maximum value equal to 255 (that is to say 8 digits):

(a) If there is established a weight to weight correspondence between the information and the integration memory of the exploitation block, all the informations integrated in the memory will be found distributed between the addresses 0 and 255 of the block, (b) If, on the contrary, the experimenter wishes to keep these first results and to integrate the sequence of these same informations between addresses 256 and 511, it will suffice to produce a systematic offsetting of 256 by applying the reference digit to the ninth weight address parallelly to the eight others which may, in this case, constitute the information, (c) An offsetting of 512 might likewise be obtained by application of the reference digit to the tenth weight address, (d) An offsetting of 768, that is to say of 256+512, might be obtained by the simultaneous introduction of the reference digit to the ninth and tenth weight addresses, and so on.

It is therefore possible, owing to these translation switches, to switch, either manually or electronically, a $n$ digits information into an integration memory of a capacity greater than $n$ digits.

In an embodiment of the invention, each of the sub-units of the analyzer device comprises (FIG. 2), (with the exception of the input sub-unit 1 and of the output sub-unit 8), to permit transmission of the groups of pulses from one sub-unit to another one, in combination:

$n$ input registers 15 capable of temporarily storing up the $n$ information pulses (at most) of a group (such as $c$ or $d$) representing a number designating every elementary information to be treated in the sub-unit;

One or several functional devices 16 capable of performing on these $n$ information pulses $i$ the function or functions performed by the sub-unit;

$n$ output devices 17 each comprising a gate circuit 18 and an impedance transforming circuit 19; and A pilot device 20 capable—in response to a reference pulse $j$ which represents the reference digit and which reaches it, from the upstream sub-unit, at the same time as the associated $n$ information pulses $i$ reach the $n$ registers 15 from said upstream sub-unit—of controlling the operation of the functional device or devices 16 by means of pulses $e$ transmitted through a conductor 21, of releasing, by means of pulses $f$ transmitted through a conductor 22, the gate circuits 18 of said output devices 17, in order to permit a transmission to the downstream sub-unit of the group of informations $i$ (possibly treated in the device or devices 16), of transmitting to this downstream sub-unit a reference pulse $j_1$, in synchronism with said group of information pulses $i$, and of producing the resetting to zero, by means of pulses $g$ transmitted through a conductor 23, of the $n$ registers 15 in order to permit said registers to take into charge a new group of information pulses $i$.

It will be noted that the last devices (in the direction of transmission) of sub-unit 1 may be similar to the last devices just above mentioned of the standard sub-units and that likewise the first devices of sub-unit 8 may be similar to the first devices just above mentioned of the standard sub-units.

We will now give more complete explanations relative to the importance of the reference pulse associated with every group of information pulses. As a matter of fact, as above indicated, to the group of simultaneous information digits which determines every elementary information, we have added, according to the present invention, a reference digit (or pulse). For instance, we may provide that every elementary information is characterized by a group of parallel pulses, the maximum number of which is fifteen, this group being accompanied by a reference sixteenth pulse. The form, amplitude, polarity, width in time or duration, and "position in time" of the reference pulse are identical to the form, amplitude, polarity, duration and position in time, respectively, of the information or "weight" pulses which determine the information. Whatever be the type (complete information or fraction of information) or the magnitude characterized by the whole of the information pulses or digits, the reference pulse or digit always exists, even if the binary number represented by the information digits or pulses is equal to zero. As a matter of fact, it is necessary to be able to make the difference between the value zero of the information and the absence of information. Therefore, any information is automatically accompanied, in parallel, by a reference digit, and this whatever be the numerical value of the information.

The reference pulse or digit permits, all along the analyzer device, of determining, in the different sub-units, the time when the information occurs, therefore the group of digits that determines it, which permits an easy piloting of the information treatment operations, whatever be the number that determines the information.

The reference digit or pulse also performs particular functions in some sub-units. Thus:

In the timing sub-unit and in the digital switch, where the times of access are very short (for instance ranging from 0.3 to 1 microsecond), the reference pulse serves to ensure the switching, or the setting in memory, of the information and this pulse permits of knowing whether there are or not two informations following each other at an interval smaller or greater than a duration T taken as reference or more simply than a duration corresponding to the time of access to a given sub-unit or device.

In the storing sub-unit, the reference pulse permits of simplifying the circuits and even of making possible the elimination of erroneous informations (details on this subject are given in the above cited patent application).

In the translation switches, the reference pulse may be used as signal for the translation of an information, as above indicated.

Owing to the above stated organization of the sub-units, to the application of an intermediate standard code (pure parallel binary code) transmitted between the different sub-units through connection cables which are themselves of standard type, to the adjunction of a reference pulse to every information pulse group, and to the utilization of input devices and output devices which are the same for all the sub-units (with the exception of course of the input sub-unit 1 and of the output sub-unit 8, the first one comprising no input device of the standard type and the second one no output device of the standard type), each of the sub-units can easily be replaced if necessary. It is thus possible to provide, by means of such functional blocks, a "tailor-made" analyzer device which is perfectly well adapted to the problems set up by the physical phenomenons, in particular the nuclear ones, to be studied. In particular, sub-unit 1 is chosen according to the nature of these phenomenons; storing sub-unit 5 is used only if necessary; the device may either comprise or not a conditioning sub-unit 7, this sub-unit being more or less complicated as the case may be and being adapted to cooperate or not with a calculating sub-unit 6, itself more or less complicated; finally, according to the nature of the display that is desired, we may use an output sub-unit 8 of suitable type. It may also be advantageous, in order to analyze some complex experiments, to associate in parallel several systems of the kind shown by FIG. 1 (which is possible due to the above mentioned characteristics of every unit), such an association making it possible to increase the total capacity of analysis.

In every sub-unit 3, 5, 6, 7, 8 comprising standard input devices, the latter comprise, as above indicated, $n$ elementary registers (for instance 15 registers) when the information is represented by 15 pulses: ($n=15$), every register consisting of a bistable element, for instance a bistable multivibrator. These input registers are necessary because it is not possible to provide a treatment device, in the different sub-units, such that the only presence of the parallel pulses $i$ of the standard code (of the pure parallel binary type) is sufficient to ensure, if these pulses were applied directly to the device, a correct operation thereof. As a matter of fact, it is not possible to request from these pulses a perfectly determined and stable shape and amplitude. Furthermore, the time corresponding to the only duration of the pulses applied to the inputs of a sub-unit would not be sufficient to ensure a correct treatment and a total transfer through the sub-unit. This is why we have provided, as above stated, registers 15 having two stable states which are, at the beginning of every cycle, in the "zero" state representing digit "0." Every input conductor 24 attacks a register 15 the function of which is to place in memory any digit or pulse that occurs along this conductor. If the digit is "0," the register remains in its "zero" state, whereas if the digit is "1," the register switches over from its first stable state "zero" to its second stable state "one." At the end of the treatment in the sub-unit, the pilot device 20 returns all the registers 15 to the "zero" state by means of a pulse $g$.

The treatment and/or the storing up of the information in the device or devices 16 of the sub-unit depends upon the particular sub-unit that is being considered. Examples of devices 16 are given in the above mentioned patent application and also hereinafter with reference to FIGS. 3–4 and 5–15. Anyway, after treatment or setting into a memory, it is necessary to transmit the information to the next sub-unit and this in the pure parallel binary code. This transmission is performed by output devices 17 which are provided in the respective sub-units, with the exception of course of the output sub-unit 8. The function of the output devices is to perform the following operations:

To read the last stage or stages of the device or devices 16 of the sub-unit,

To deliver, through every parallel output conductor 25, digital signals or information pulses $i$, identical in form, amplitude and duration, and this at the same time, To introduce a sufficiently low internal impedance so that, account being taken of the speed of the pulses, no substantial disturbance is brought thereto, whatever be the practical length (averaging 1 to 5 meters as a rule) of the connecting cables extending between the different sub-units.

All these functions are obtained owing to the structure of every elementary output unit 17, which comprises:

An "AND" circuit 18 fed, on the one hand, by the last corresponding stage of the device or devices 16 and, on the other hand, by the common line 22 issuing from the pilot device 20, the function of which is to permit the outflow of the pulses constituting the information when a pulse $f$ is sent by device 20 through this line 22; and An impedance transforming circuit 19 making it possible to transmit through a conductor 25 the pulses $i$ without deformation from the corresponding "AND" circuit 18.

Finally, every sub-unit, with the exception, maybe, of the input sub-unit 1 and of the output sub-unit 8, comprises, as above stated, a pilot control device 20 which, in addition to some particular functions which it may perform (in particular through pulses $e$ transmitted to device or devices 16 through one or several conductors 21) in every particular sub-unit (see, concerning this, the above mentioned patent application and also the following detailed description with reference to FIGS. 3–4 and 5–15), must perform the following functions:

To reset to zero, by means of a pulse $g$, transmitted through conductor 23, the input registers 15 at the end of the operation of the sub-unit, To permit, by means of a pulse $f$ transmitted through line 22, the transmission (through the "AND" circuits 18) of the pulses constituting the information, treated and/or stored up in the device or devices 16, toward the downstream sub-unit.

Finally, to transmit a reference pulse or pilot control pulse $j_1$ toward the pilot control device of the downstream sub-unit.

We will now describe with reference to FIGS. 3 and 4 a preferred embodiment, given by way of non-limitative example, of a timing sub-unit according to the invention.

Such a sub-unit is intended to distribute, at regular time intervals, elementary informations that reach it in an irregular fashion in the form of groups of $n$ binary digits (or bits), the damping effect being adapted to correspond to a number of groups up to $a$. Such a sub-unit permits of making substantially periodical the random informations from the analyzing or input sub-unit (FIG. 1). It permits of increasing the capacity of the analyzer device at the same time as the safety of operation thereof while considerably reducing the time of resolution of the device.

For this purpose, the central device 16A corresponding to the device 16 of FIG. 2 of the timing sub-unit is constituted by the combination of the following elements:

A matrix 26 of tunnel diodes 27, each of which can be fed on its input 28, through two resistors 29–30, by two half-currents (every tunnel diode 27 remaining in its initial or "zero" state if it is attacked by a single half-current, but switching over from said "zero" state to another state called "one" state if it is attacked simultaneously by two half-currents), the tunnel diodes 27 being grouped in $a$ rows of lines (in FIG. 3, for the sake of simplicity, we have shown only three lines), each comprising $n$ tunnel diodes (in FIG. 3, we have only shown three columns of the matrix of diodes, that is to say only three tunnel diodes on every line), the first half-input 31 of a tunnel diode 29 of every row being connected to receive one of the $n$ digits or pulses $i$ of a group (these pulses $i$ having been shaped in the input devices 15A of the timing sub-unit which play the part above indicated for the input device 15 of FIG. 2), whereas the second half-inputs 32 of the $n$ tunnel diodes of a row are connected in parallel so as to be able simultaneously to receive a pilot pulse $e_1$ choosing a free row or line.

A first series of $a \cdot n$ transistors 33 each of which is either conductive (saturated) or blocked according as the tunnel diode 27 with which it is associated is either in state "one" or in state "zero," the basis 34 of every transistor 33 being connected to the input 28 of the tunnel diode 27 associated therewith, and A second series of $a \cdot n$ transistors 35, the emitter 36 of a transistor 35 of the second series being connected with the collector 37 of a transistor 33 of the first series, whereas the basis 38 of the transistors 35 of the second series is connected to receive the reading pulses $m_1$, pulses $p$ for resetting to "zero" the tunnel diodes 27 of a row being applied, after the reading pulses $m_1$ for the same row of tunnel diodes, on the input 28 of every tunnel diode 27 of this row.

In FIG. 3, we have diagrammatically indicated by means of circles 39 every element of matrix 26, which is indicated in detail in FIG. 4, matrix 32 comprising $a \cdot n$ elements (in FIG. 3, matrix 26 comprises $3 \times 3$ elements 39). In a particular embodiment, $n=15$ and $a=8$, the memory-matrix comprising eight lines or rows of fifteen tunnel diodes, for instance of the T1976 type.

According as the timing sub-unit works with groups including up to $n-1$ information digits or pulses, or with pairs of groups including up to $2n-2$ digits, the number of lines or rows of the matrix 26 in use is either six or three (in the case where the memory-matrix contains eight lines), which, for a rate of less of 1% at the input, corresponds to input mean frequency/extraction frequency ratios ranging from 0.45 to 0.75, respectively.

During operation, the tunnel diodes of every line of the matrix are initially in state "zero" (low impedance in reciprocating current of the diode). When the pilot or control device 20A of the timing sub-unit sends, through conductor 23A, pulses $g$ into the input device 15A, the information pulses $i$ arrive to inputs 31. Selection of the line of matrix 26 in which the recording must take place is obtained also by means of the pilot device 20A which sends pulses $j$ into a shaping device 50 delaying and/or elongating these pulses $j$ by a constant amount $t$ to give delayed or elongated pulses $j_t$ which attack a shift register consisting of $a$ bistable multivibrators 51 of the quick switching type connected for switching over sucessively one after the other in response to the successive pulses $j_t$ arriving thereto through conductor 56, in such manner as to transmit through the successive conductors 57, voltage steps $z$ of weights "one," "two," "four" . . ., which are decoded in a decoding device 52 selecting, through pulses $w$, a free line of matrix 26.

Pulses $w$ are applied on a first input of $a$ "AND" circuits or gates 53 which receive through their other input pulses $j$ coming, through conductor 54, from pilot device 20A. Consequently, it will be seen that pulses $j$ produce successive voltage steps $z$ which, decoded in decoding device 52, successively open gates 53 to the subsequent pulses $j$ arriving through conductor 54. The gate 53 which is effectively open transmits pulse $j$ as pulse $e_1$, which is applied through one of the conductors 55 to all the input terminals 32 of the tunnel diodes 27 of the line of matrix 26 corresponding to this actually open gate. On every pulse $j$, register 51 moves forward one step and a new gate 53 is open; consequently a new line of matrix 26 is chosen for recording. As a matter of fact, the simultaneity of pulses $e_1$ (for line selection) and $i$ (for information) on the two input terminals 32 and 31 of a tunnel diode 27 causes the latter to switch over into state "one" (high impedance in reciprocating current). It will therefore be seen that, in a line chosen by pulses $e_1$ as above explained, the tunnel diodes 27 that receive pulses $i$ switch over from state "zero" to state "one" whereas the tunnel diodes which do not receive pulse $i$ from device 15A do not switch over. In other words, pulses $g$ (arriving through conductor 23A) control the transfer of the pulses from device 15A to a line of tunnel diodes 27 of matrix 26 (line chosen by elements 51, 52, 53), the numerical information, in the form of digit pulses, being therefore transferred from device 15A to a line or row of tunnel diodes of matrix 26, in which line it is stored up.

The state of every tunnel diode 27 is given for the associated transistor 33 which is respectively conductive (saturated) or blocked according as the associated diode is either in state "one" or in state "zero." When transistor 33 is in the conductive state and when a reading pulse $m_1$ is applied to the basis 38 of the associated transistor 35, an output pulse $v$ is available on the collector 46 of transistor 35. On the contrary, if the transistor 33 associated with the transistor 35 receiving on its basis pulse $m_1$ is blocked (nonconductive), no pulse is available on collector 46. The same occurs when, transistor 33 being saturated, the basis 38 of transistor 35 does not receive any pulse $m_1$ (that is to say when transistor 35 is itself blocked) because, in this case, it is diode 47 that leads the current toward the negative bias terminal 48 (at 4.5 volts) which serves also to give a negative bias to the input 28 of the tunnel diodes 27 so that the latter are normally in the "zero'" state at low impedance in reciprocating current.

The collectors 46 of all the transistors 35 of a given collector are grouped for delivering their outputs to an output conductor 49, the respective column conductors 49 being connected to the inputs of the output device 17A (analogous to the output device 17 of FIG. 2) which delivers the output pulses $i$ when it receives, through conductor 22A, an output control pulse $f$ from pilot device 20A.

Control of the reading pulses $m_1$, which has for its effect to bring into evidence the state of the $n$ tunnel diodes of a line of matrix 26, that is to say the state of the $n$ transistors 33 of this line, is also controlled by pilot device 20A, by means of output permitting pulses applied simultaneously to all the elements of the matrix through a conductor 58 and of effective output control pulses applied to the elements of a single line of said matrix, chosen by reading line selecting means, analogous to the means (above described) for selecting lines for recording. As a matter of fact, the means for selecting lines for reading comprise an "AND" circuit 41 which receives, on the one hand, through a conductor 40, voltage steps $r$ for controlling the reading and, on the other hand, clock pulses $s_0$ coming, through a conductor 42, from a pilot-oscillator or clock 43 determining the output timing of the informations, that is to say from the sub-unit of FIG. 3. The "AND" circuit 41 therefore delivers a pulse $x$ to conductor 59 at regular intervals. These pulses $x$ are applied to a shift register (analogous to register 51) consisting of $a$ bistable multivibrators 44 connected in series so as to switch over successively, in response to pulses $x$, so as successively to feed, through conductors 66, with voltage steps $z_1$, of weight "one," "two," "four," . . ., a decoding device 45, analogous to device 52 and having its output connected to line conductors 61 for the reading steps $y$ which, in combination with the pulse arriving through conductor 58, form the reading pulses $m_1$.

Two state detectors $N+2,N$ and $N-2,N$ (N representing the number of a line of the matrix) indicated respectively by 62 and 63, ensure that, in every line, the order of the operations is correct; inscription, then reading, of the information pulses.

Finally, a pulse $p$ for resetting the tunnel diodes 27 of a line of matrix 26 to state "zero" is sent, at the end of the operation, from pilot device 20A, the circuit of application of pulse $p$ on a line of tunnel diodes 27 being not shown on FIG. 3 for the sake of simplicity.

Thus, the informations arrive at an irregular rate and get out at a regular rate imparted by clock 43.

The timing sub-unit which has just been described permits times of resolution ranging from 0.2 to 0.3 microsecond. Furthermore, there is no interaction between the output and the input of the respective rows or lines of the matrix, which permits of simultaneously recording an information on one of the lines of the matrix and extracting another one from another line. On the other hand, the pilot and interdiction devices are simple and the power supplied by the transistors is relatively small.

The device for analyzing physical phenomenons, in particular nuclear phenomenons, which has just been described, has, over the existing analyzer devices, many advantages and in particular the following ones:

First, it permits of taking into consideration more than one variable, which is very interesting to perform a detailed analysis of physical phenomenons and in particular nuclear phenomenons.

It is possible to record in the non-integrating memory 5, for instance on a magnetic tape, the whole of the spectrums of the variables, then of asking a series of questions from this memory. When the duration of reading is shorter than the duration of recording, much time is won. Furthermore, it is possible to ask questions which had not been thought of at the time when the experiment was made.

It is possible to store up in memory 5 raw data, that is to say data which are only subsequently treated in sub-units 6 and 7. It is consequently possible to perform a number of operations, which were not thought of initially, on the non-integrating informations or portions of information stored up in memory 5.

As the analyzer device consists of a series of removable sub-units, it is possible to make analyzer devices which are "tailor-made" for every physical, in particular nuclear, phenomenon to be analyzed, the analyzer device comprising the whole or only a portion of the sub-units of FIG. 1, whereas sub-units 1, 6, 7 and 8 may be made in accordance to the kinds of physical phenomenons and analysis that are considered. It is even possible, after having stored up in the non-integrating memory 5 the results of a series of experiments, to treat these results by means of devices 6, 7 and 8 of different types. It is also possible to associate in parallel several systems of the type illustrated by FIG. 1 in order to increase the capacity of analysis.

It will be seen that the flexibility of the analyzer device with the improvements according to the present invention is very great. On the other hand, the stability of the device, during the experiments, is excellent.

We will now describe, with reference to FIGS. 5 to 15, a conditioning device adapted to be inserted in a functional analyzing chain or information treating chain, in particular in the dimensional analyzer of FIGS. 1 to 4, treating the magnitudes resulting from a nuclear physics experiment to make sure that some magnitudes or informations truly comply with at least one given condition.

Reference being made chiefly to FIG. 5 for the functional arrangement and to FIG. 6 for the pulses and signals brought into play, the quick conditioning device comprises, in combination:

(a) On the one hand, in a known manner:

(1) An input intermediate memory A which successively receives, preferably at regular time intervals, the information pulses or digit pulses $i_2$ (belonging to the total informations $d$) for which it is to be verified whether they comply or not with a given condition either from the timing sub-unit (that is to say from translators for transforming the physical magnitudes to be measured—in particular energies, times, angles, etc., for the analysis of nuclear experiments—in the code of the functional analyzer or conditioning device that is to say the pure parallel binary code), or from the storing sub-unit 5 (magnetic tape or other great capacity memory) in which have been set in memory the prior answers of the collectors written in said code and which stores up the informations in said code;

(2) At least one reference memory (for instance two memories B and C) wherein we may display, that is to say record, at least one limit condition, this recording being effected in said code;

(3) A comparator device (comprising for instance two comparators D and E) capable of comparing the coded information contained in the intermediate memory A to at least one coded limit condition, contained in the reference memory or memories B, C, and to deliver a given output signal $f_2$ if this comparison is to conform (in the case, illustrated by the drawing, of two comparators, a conformity signal $d_0$, $e_0$ is transmitted at the time of verification of the condition imposed in every corresponding comparator D, E, the output signal $f_0$ representing the simultaneous existence of signals $d_0$ and $e_0$ by the action of an "AND" circuit F which delivers at its output a signal $f_2$ only when its two inputs are simultaneously supplied one with a signal $d_0$ and the other with a signal $e_0$); and (4) An output circuit G, capable of transferring, to another device or another sub-unit, the information contained in the intermediate memory A (as coded information $i^2$ generally complying with the imposed condition or conditions and shaped by the output circuit G); and (b) On the other hand, according to a characteristic of the invention:

(5) A conditioning gate H controlling the output of the comparator device;

(6) A system of authorization gates J controlling the output of the intermediate memory A, these gates J being capable of receiving, on their controlled input $m_{0'}$, the output (consisting of a pulse $h_0$) of said conditioning gate H; and (7) A pilot or control device K which receives (from a clock or from the above mentioned magnetic tape) a succession of reference signals $j_2$, synchronized with the coded signals $i_2$ (in such manner that every signal $i_2$ arriving to A is accompanied by a signal $j_2$ arriving to K at the same time) and therefore preferably occuring at regular time intervals, and which delivers, in response to every signal $j_2$.

On the one hand, on a first output $k_0$ connected to the control input $P_0$ of gate H, a release pulse $j_0$, delayed with respect to this reference signal $j_2$ by a time $t_1$ greater than the maximum duration $t_2$ necessary to comparator device D, E for performing a complete comparison operation, this pulse $j_0$ serving to release gate H so as to enable it to transmit the possible output signal $f_2$ from the comparator device, which signal is normally applied (as output pulse $h_0$) to said gate system J for releasing it in order to permit transfer of the coded information contained in the intermediate memory A to the output circuit G, release of this system of gates J being possibly effected, in some cases, directly by a release pulse $j_0$ (a switch L enables the operator to choose the releasing pulses applied on the control input $m_0$ of the system of gates J: in the position shown in solid lines, switch L directs the pulses $h_0$ toward this input $m_0$, and therefore controls the transfer of the informations from intermediate memory A only if the comparator device D, E has checked that the condition or conditions that are imposed are complied with, whereas, in the position shown in dotted lines, switch L permits said transfer freely under the only control of pulses $j_0$, that is to say even if said condition or conditions are not complied with, the comparator device being in this case placed out of circuit), and On the other hand, to a second output $q_0$ connected to an input $r_0$ for resetting to zero the intermediate memory A, a zero resetting pulse $g_2$, delayed with respect to the corresponding release pulse $j_0$ by a duration $t_3$ greater than the duration $t_4$ for the transfer of the coded information contained in the intermediate memory to the output circuit.

The coding system which is best suitable for such a conditioning device being the pure or natural binary system and the invention applying particularly to the parallel transmission system, we will consider hereinafter only the case of a conditioning device working in the pure parallel binary system, every information $i_2$ consisting of $n$ bits each equal either to "zero" or to "one" arriving in parallel into the intermediate memory A in the form of a set of voltage pulses (on the conductor or conductors corresponding to binary rows or orders for which the bit to be transmitted is "one") and/or of absences of pulses (on the conductor or conductors corresponding to the binary rows or orders for which the bit to be transmitted is "zero"). The choice of a coding and transmission parallel system requires that the memories A, B, and C and the output circuit G comprise $n$ memory registers and $n$ analogous elementary circuit pulses, adapted to work in parallel. It will be seen that the same occurs for comparators D and E and the system of gates J consisting of $n$ gates in parallel.

In FIG. 5, we have shown in solid lines the conductor transmitting the coded informations bit by bit between corresponding elementary devices, in dash lines those through which pass the signals of the comparator device and in dotted lines the conductors serving to the transmission of the pilot pulses (reference, release and zero resetting pulses).

FIG. 6, where the times $t$ have been plotted in abscissas (from an origin corresponding to the simultaneous beginning of a coded information $i_2$ and of the corresponding reference pulse $j_2$), and the voltages $u$ in ordinates, illustrates the series of signals and pulses occurring in the operation of the conditional device according to FIG. 5.

We have shown first in FIG. 6 how are represented the bits "1" and "0," respectively, of an information $i_2$ coded in the pure parallel binary system, voltage pulse $i_1$ corresponding to a bit "1" of information $i_2$ and the absence of information $i_0$ to a bit "0." This figure also shows the reference pulses $j_2$ arriving at the same time as pulses $i_1$. In particular, the $n$ bits of information $i_2$ and pulse $j_2$ may come from a magnetic tape including $n+1$ tracks read by means of $n+1$ reading heads having their outputs connected, on the one hand, to intermediate memory A and, on the other hand, to pilot device K.

In the $n$ elementary registers (an elementary register such as $A_0$, $A_1$, $A_s$ being provided for every bit of the coded informations $i_2$) of memory A (every register being constituted by a device, such as a bistable multivibrator, having two stable states which represent "0" and "1" respectively), the pulses $i_1$ and the absence of pulses $i_0$ are kept in memory in the form of potentials $b_1$ and $b_0$ respectively. According as the coded information $i_2$ complies or not with the imposed condition or conditions, the comparator device either transmits a signal $f_2$, represented by a voltage pulse $f_1$, or transmits no signal (voltage $f_0$).

On the other hand, the control device K has transmitted, in response to the reference pulse $j_2$, a release pulse $j_0$ delayed by a duration $t_1$ (greater than the maximum duration $t_2$ of elaboration of the possible pulse $f_1$). The possible simultaneity of $j_0$ and $f_1$ produces pulse $h_0$ which ensures the transfer of pulses $i_1$ and the absence of pulses $i_0$ (stored as $b_1$ and $b_0$, respectively, in memory A) to the output circuit G and thence toward the subsequent element of the analyzing series, as bit pulses—either $i^1$ (for $i_1$), or $i^0$ (for $i_0$)—of the conform information $i_2$, coded and set in shape. In response to a pulse $j_2$, device K also transmits a zero resetting pulse $g_2$ delayed, with respect to $j_0$, by a duration $t_3$ (greater than the duration $t_4$ of the transfer of the information from A to G), this pulse $g_2$ resetting to zero all the elementary registers $A_0$, $A_1 \ldots A_s$ of memory A, which ends the potentials of $b_1$ type and therefore generally the signal $f_1$ (because the solution "0" generally does not comply with the imposed condition or conditions).

The comparator device may be made in different manners. A particularly advantageous embodiment is illustrated in the form of blocks by FIGS. 7 and 8. FIG. 7 shows a particular stage making it possible to compare a number in pure binary code, recorded in the intermediate memory A (one stage $A_s$ of which is illustrated), and constituting an information $i_2$, to a number, also in pure binary code, indicated by a reference memory B (one stage $B_s$ of which is shown) and constituting an imposed limit condition $y^0$. A system of stages according to FIG. 7 permits of determining whether $i_2$ is higher than, equal to or lower than $y^0$.

The elementary comparator of FIG. 7 is based upon the properties of numbers in the binary code. When comparing the successive bits of two binary numbers in the order of decreasing rows, the first inequality between two bits of a given row will indicate that one of the numbers is different from the other, the greater number being that which corresponds to bit "one" in this row, whereas the smaller number is that which corresponds to a "zero" in this rank.

Calling, on the one hand, $i_s$ and $y_s$ the bits of $i_2$ and $y^0$ in a binary order or rank where comparison is effected and, on the other hand, $\bar{i}_s$ and $\bar{y}_s$ the complements or negations of $i_s$ and $y_s$ respectively, we will have in this rank, in case of inequality, a signal $i_y=1$ indicating that $i_2$ is smaller than $y^0$, when $\bar{i}_s \cdot y_s = 1$ and a signal $s_y=1$, indicating that $i_2$ is greater than $y^0$, when $i_s \cdot \bar{y}_s = 1$, by representing by a point the logical operation or coincidence effected by an "AND" circuit or gate (complementary details concerning the comparison in the pure binary system are given in the French Patent No. 1,290,220 filed Feb. 27, 1961 and delivered on Mar. 5, 1962 to Commissariat à l'Energie Atomique).

Now, the operation of a comparator stage of the type illustrated in FIG. 7 and of the whole of the comparator device with its output gate, illustrated by FIG. 8, will be easily understood in the case where it is desired to check up that $y^0$ is smaller than $i_2$, itself smaller than $z^0$, $i_2$ being stored up in memory A and $y^0$ and $z^0$ in memories B and C respectively, in the pure parallel binary code.

For every binary rank or order and for every inequality to be checked up, we provide a comparator stage which comprises (FIG. 7), in addition to the elementary register, such as $A_s$, which permits of storing up a bit $i_s$ of the information $i_2$ to be treated and of the elementary register such as $B_s$ in which is displayed the bit $y_s$ corresponding to condition $y^0$:

Means $\bar{A}_s$ and $\bar{B}_s$ associated with $A_s$ and $B_s$ respectively, for storing up or displaying the complements or negations $\bar{i}_s$ of $i_s$ and $\bar{y}_s$ of $y_s$ respectively (as a matter of fact, the system $A_s$, $\bar{A}_s$ may consist of a bistable multivibrator with two complementary outputs and the system $B_s$, $\bar{B}_s$ of a double reversing switch representing the two possible values of $y_s$ and its complement);

Two "AND" circuits M and N, the first of which receives $i_s$ and $\bar{y}_s$ and the second of which receives $\bar{i}_s$ and $y_s$, the respective outputs of which deliver $s_y = i_s \cdot \bar{y}_s$ and $i_s = \bar{i}_s \cdot y_s$;

An inclusive "OR" circuit P the outputs of which are connected to the outputs $s_y$ and $i_y$ of the two "AND" circuits and the output of which delivers a signal $\bar{r}_s$ when $i_y$ or $s_y$ is equal to 1, the whole of circuits $\bar{A}_s$, $\bar{B}_s$, M, N, P forming an "exclusive OR" circuit (that is to say a circuit which delivers an output signal only if one of its inputs, and only one, is supplied with an input signal, whereas an "inclusive OR" circuit delivers current at its output when at least one of its inputs is fed with current) for the input signals $i_s$ and $y_s$;

A comparator Q deducing from the output $\bar{r}_s$ of the "OR" circuit P its complement or reverse $v_s$;

A reading circuit R for examining the equality or inequality of $i_s$ and $y_s$, which delivers a signal $w_s$ in case of inequality.

The different states of elements $A_s$, $\bar{A}_s$, $B_s$, $\bar{B}_s$, M, N, P and Q are summed up in the following table for the four combinations of the values of $i_s$ and $y_s$:

| | $A_s$ | $\bar{A}_s$ | $B_s$ | $\bar{B}_s$ | M | N | P | Q | Remarks |
|---|---|---|---|---|---|---|---|---|---|
| $i_s=0$ $y_s=0$ | 0 | 1 | 0 | 1 | 0 | 0 | 0 | 1 | $i_s=y_s$ |
| $i_s=1$ $y_s=0$ | 1 | 0 | 0 | 1 | 1 | 0 | 1 | 0 | $i_s>y_s$ |
| $i_s=0$ $y_s=1$ | 0 | 1 | 1 | 0 | 0 | 1 | 1 | 0 | $i_s<y_s$ |
| $i_s=1$ $y_s=1$ | 1 | 0 | 1 | 0 | 0 | 0 | 0 | 1 | $i_s=y_s$ |

It follows from this table that a signal issues from the reversing element Q every time $i_s=y_s$ and only in this case.

In order to compare the different bits of the two binary numbers, we group $n$ elementary circuits of the type of that illustrated by FIG. 7 and we provide control circuits which permit of continuing the comparison for decreasing ranks or orders as long as there is an equality between the bits and on the contrary of blocking the comparison stages which follow the first inequality that is met with, the latter indicating that the comparison has been performed. Therefore we obtain, as illustrated by FIG. 7, on the one hand, the transmission to the two "AND" circuits M and N of every stage (with the exception of the stage of the highest order) of a release signal $v_{s+1}$ coming from the stage of immediately higher order $s+1$ (and corresponding to the signal $v_s$ transmitted by the reversing element Q, this signal existing, that is to say representing bit "1," in case of inequality between the two bits to be compared of stage $s$), and on the other hand, the transmission to the "OR" circuit P of every stage $s$ (With the exception of that of the highest order) of a signal $w_{s+1}$ coming from the circuit R for the examination of the equality of the stage of immediately higher order $s+1$ (and corresponding to the signal $w_s$ of the stage $s$ which exists in the case of inequality). Thus, the "AND" circuits M or N work normally (checking up the simultaneity of $i_s$ and $\bar{y}_s$ or of $\bar{i}_s$ and $y_s$) when no inequality has been disclosed in a higher order and they supply current in case of inequality in the order or rank to which they correspond, whereas the "OR" circuit P receives a signal $w_{s+1}$ in case of inequality in a higher stage or a signal from M or N in case of inequality in its own stage. Circuit P therefore supplies current when an inequality exists in stage $s$ or in a stage of higher order and then the associated "NO" circuit Q does not supply current.

In order to determine the duration of the inequality, when an inequality has been indicated by the fact that the "OR" circuit P feeds current and therefore by the fact that a signal $w_s$ has been transmitted, it is necessary to ascertain whether it is M or N that supplies current. According as the examination is concerned with the whole of circuits M or with the whole of circuits N, it is possible to determine whether the binary number representing an information $i_2$ is higher or lower, respectively, than the binary number $y^0$ displayed in memory B.

In the general case, where a double comparison is to be effected between an information $i_2$ and two conditions, one $y^0$ recorded in memory B and the other $z^0$ recorded in memory C, in such manner as to check up the double inequality: $y^0$ smaller than $i_2$ itself smaller than $z^0$ ($z^0$ being of course greater than $y^0$), we provide two elementary comparators D and E (FIG. 1) including each $n$ stages (one stage for every binary order) similar to the stage illustrated by FIG. 7. The whole of the M circuits is investigated in comparator E, which effects the comparison of $i_2$ with the upper limit $z^0$, whereas it is the whole of circuits N that is investigated in comparator D, which effects the comparison of $i_2$ with the lower limit $y^0$. When the above mentioned inequality is complied with, the two comparisons supply a negative answer.

Such a system of two comparators, together with the control circuits and the output gate for the whole of the comparator device, is represented in FIG. 8.

In this FIG. 8, we have illustrated:

The elementary registers $A_0, A_1 \ldots A_{n-1}$ of the intermediate memory A;

The elementary registers $B_0, B_1 \ldots B_{n-1}$ of memory B in which the lower limit $y^0$ is displayed;

The elementary registers $C_0, C_1 \ldots C_{n-1}$ of C in which the upper limit $z^0$ is displayed;

The stages $D_0, D_1 \ldots D_{n-1}$ constituting the exclusive "OR" circuits of comparator D and including the examination of the "AND" circuit N;

The control circuits which, as soon as an inequality has been found to exist in a stage $D_{n-1}$ to $D_1$, prevent comparison in the stages of lower order, which circuits are shown at S;

Stages $E_0, E_1 \ldots E_{n-1}$ analogous to stages $D_0, D_1 \ldots D_{n-1}$, but belonging to comparator E and including circuits for investigating the whole of the circuits M (and not of the circuits N);

The control circuits blocking the stages $E_{n-2}$ to $E_0$ of an order lower than that where an inequality has been disclosed, which circuits are represented at T;

Inclusive "OR" circuits or mixer circuits $U_a, U_b, U_c$, the first one mixing the outputs of stages $D_0, D_1 \ldots D_{n-1}$ and therefore transmitting an output signal as soon as an inequality indicating that $i$ is greater than $z$ has been disclosed in one of the stages $D_0, D_1 \ldots D_{n-1}$, circuit $U_b$ mixing the outputs of stages $E_0, E_1 \ldots E_{n-1}$ and therefore delivering an output signal when an inequality indicating that $i$ is smaller than $y$ has been disclosed by one of said stages, and circuit $U_c$ mixing together the outputs from $U_a$ and $U_b$ and therefore delivering a signal when at least an inequality of the above mentioned type has been disclosed by one of the stages $D_0, D_1 \ldots D_{n-1}, E_0, E_1 \ldots E_{n-1}$, that is to say finally when $i_2$ is either smaller than $y^0$ or greater than $z^0$, that is to say when $i_2$ does not comply with the imposed condition that it must be comprised between $y^0$ and $z^0$; and A "NOT" gate V which delivers a signal $f_2$ when $U_c$ does not deliver current, that is to say when $i_2$ truly complies with the conditions that have been imposed (the whole of the "OR" circuits $V_a, V_b, V_c$ to which signals are applied in case of non-conformity, that is to say the complement or negation of possible conformity signals, and of the "NO" circuit V is logically equivalent to the "AND" circuit F of FIG. 5 which receives possible conformity signals from comparators D and E).

The signal issuing from circuit V, which constitutes the output signal $f_2$ of the comparator device, is applied to the gate or "AND" circuit H which receives on its control input the release pulse $j_0$ transmitted (with some delay) by the pilot device K in response to a reference pulse $j_2$. The gate or "AND" circuit H therefore delivers a signal $h_0$ at the time determined by the application of pulse $j_0$ if the comparator device has found that the imposed conditions are complied with, that is to say has transmitted signal $f_2$. As above indicated, pulse $j_0$ is delayed witt respect to $j_2$ by a duration $t_1$ greater than the duration of elaboration of signal $f_2$, whereby signal $f_2$ (in the same manner as $f_1$, FIG. 6) occurs (if the comparison of $i_2$ with $y^0$ and $z^0$ complies with the conditions that are imposed) at the time of application of pulse $j_0$.

We will now describe, with reference to FIGS. 9 to 15, in detailed fashion, a complete embodiment of a conditioning device including the improvements according to the invention.

In FIG. 9, we have illustrated an elementary register of intermediate memory A with its inputs, its outputs, the "AND" circuit J constituting the output gate of the intermediate memory and the portion of the output circuit G corresponding to a binary order $s$.

The elementary register $A_s$ of memory A consists of a bistable multivibrator 111 with two transistors 112 and 113 having their coupled emitters earthed. The base of transistor 113 receives, through diode 115, the bit $i_s$ of information $i_2$ in order $s$, whereas transistor 112 receives on its base, through diode 114, the zero resetting pulses $g_2$ applied to terminal $r_0$ through a line common to the $n$ registers $A_0$ to $A_{n-1}$ of memory A. The bistable multivibrator 111 is, at the beginning of every operation, in the state of rest where it represents bit "0." If the bit $i_s$ that is applied thereto through diode 115 is equal to "1," the multivibrator switches over to occupy its other stable state wherein it represents bit "1." If the bit that is applied through diode 115 is equal to "0," multivibrator 111 remains in its state of rest and keeps representating bit "0." At the end of the operations, pulse $k_0$ restores it to the "zero" state if it were not already in this state. Bistable multivibrator 111 comprises two complementary outputs 116 and 117, the bit, such as $i_s$, of information $i_2$ appearing at 116 as a voltage step of the type $b_1$ or $b_2$ (FIG. 6) according as it is equal to "1" or "0," respectively, whereas the reverse or complement $\bar{i}_s$ of $i_s$ appears at output 117. The outputs 116 and 117 are respectively connected, through amplifiers $W_a, W_b$ (hereinafter described with reference to FIG. 10), to the output terminals 118 and 119 respectively connected with the input terminals 118a and 119a of a comparator double stage illustrated by FIG. 11. Furthermore, output 117 is connected to one of the inputs of an "AND" circuit 120

19 through transistors 121 and 122 (constituting one stage of gate J) which receives, on its other input $m_0$, according to the position of switch L, either a release pulse $j_0$ coming from pilot device K (FIGS. 5, 8 and 14) to permit a "free" delivery (a pulse $j_0$ existing for every information), or an output signal $h_0$ delivered by gate H (FIGS. 5, 8 and 13) in the case, on the contrary, where a "conditioned" output should be controlled by the checking up of the imposed conditions (a signal $h_0$ occuring only if the imposed conditions are complied with).

As a matter of fact, the base of the transistor 121 of the "AND" circuit of every stage is positioned, in potential, by the output $\bar{i}_s$ of the corresponding registers $A_s$, whereas the base of transistor 122 receives either the successive piloting pulses $j_0$ or the successive conformity signal $h_0$ according to the position of L which is controlled by a corresponding telephone key X (FIG. 15).

The output of the "AND" circuit G is applied successively to a shaping amplifier, comprising a transistor 123 the base of which is earthed, and to an emitter-follower double stage including two transistors 124, 125 of the PNP and NPN types, respectively, which give the output pulses $i_s{}^2$ available on terminals 126 the power necessary to make it possible to transmit them through cables toward another information treatment sub-unit, for instance toward a result exploiting sub-unit. These pulses $i_s{}^2$ correspond to pulses $i_s$, if the conditions have been complied with (signal $h_0$) or in the case of free output order (signal $j_0$).

Likewise, in order transfer the bits $i_s$ and $\bar{i}_s$ from the outputs 116 and 117 of the bistable multivibrator 111 toward the comparator illustrated by FIG. 11 with the necessary power, we have provided amplifiers W$a$, W$b$ in the form of a PNP, NPN double emitter-follower, as illustrated by FIG. 10, which represents either of units W$a$ and W$b$ of FIG. 9. This FIG. 10 shows the two transistors, i.e. the PNP transistor 127 and the NPN transistor 128, of the double emitter-follower, the input terminal 129 consisting of the output 116 or 117, as the case may be, and the output terminal 130 which constitutes, as the case may be, either terminal 118 or terminal 119 connected to the terminal 118$a$ or 119$a$, respectively, of the comparator which will now be described with reference to FIG. 11.

This FIG. 11 first shows the two "AND" circuits M and N each comprising a first input 118$a$, 119$a$ for the bit $i_s$ or $\bar{i}_s$ respectively, a second input 131, 132 for the release signals $v_{s+1}$ of the immediately higher order and a third input 133, 134 receiving signal $\bar{y}_s$ or $y_s$ respectively.

Bits $y_s$ and $\bar{y}_s$ are displayed by means of two coupled switches 135 and 136 each of which may occupy two positions. In the first position, bit "1" is introduced at 133 and bit "0" at 134, whereas, in the second position of switches 135, 136, bit "0" is introduced at 133 and bit "1" at 134. The two coupled switches of every stage are controlled by a key Y (see FIG. 15).

Every "AND" circuit M or N essentially comprises a transistor 136 or 137, a diode 138 or 139 and a diode 149 or 150 of the stage of immediately higher order $s+1$ (the output 151 or 152 of the diode 145 or 150 of stage $s+1$ being connected to the terminal 131 or 132 of stage $s$), this circuit delivering current through its output 140 or 141 only when its three inputs are simultaneously fed with current, that is to say when $i_s$ is different from $y_s$ ($i_s$ being greater than $y_s$ to have M delivering current and $i_s$ being lower than $y_s$ to have N delivering current) in the stage that is considered and at the same time the stages of higher orders, having found no inequality between the information bits $i$ and the condition bits $y$, have transmitted signals $v$, in particular when stage $s+1$ has transmitted a signal $v_{s+1}$. Of course, the "AND" circuits M and N of the stage of the highest order (order $n-1$) have no input 131 or 132.

20

The mixer circuit or "OR" circuit P consists, in a very simple manner, of two diodes 142, 143 in stage $s$ and a third diode 154 in the stage of immediately higher order $s+1$ (the output 155 of the diode 154 of stage $s+1$ is connected to the terminal 156 of stage $s$), with the exception of the stage of highest order which does not comprise an input 156, the outputs of the diodes being connected to point 144 so that a signal appears at this point when at least one of the circuits M, N is delivering current. The signal from the "OR" circuit P, after passage through a transistor 145 mounted as an emitter-follower is reversed in a "NO" circuit Q which comprises a transistor 146. Finally, a transistor 147 mounted as an emitter-follower ensures the connection with the stages of lower order through terminals 151, 152 and 153.

We thus obtain finally on conductor 148 a signal when bits $i_s$ and $y_s$ are equal, equality of the bits to be compared of $i$ and $y$ having also been found in stages of higher order.

Two diodes 149 and 150 permit of obtaining, on terminals 151 and 152 respectively, signals $v_s$ of effective equality which are applied to the terminals 131 and 132 respectively of the stage of immediately lower order, the terminal 151, 152 of a stage, with the exception of the stage of zero order, being connected respectively to the terminal 131–132 of the stage of immediately lower order.

If the "exclusive OR" system constituted by the portion of FIG. 11 upstream of transistor 146 indicates an inequality in the stage of order $s$, there is no signal $v_s$, so that the "AND" circuits M and N of the stage of immediately lower order $s-1$ are blocked. On the contrary, if the "exclusive OR" system indicates an equality in the stage of order $s$, signal $v_s$ occurs and it is transmitted to the "AND" circuits M and N of the $s-1$ stage, which permits continuation of the comparison for the lower orders until an inequality is met with.

Conductor 148 is also connected to an equality examining circuit R comprising a polarity reversing transistor 153 and a diode 154 which delivers a signal in case of inequality, this signal (available on terminal 155 and corresponding to the signal $w_s$ of FIG. 7) being applied to the terminal 156 of the "OR" circuit P of the immediately lower stage so as to constitute the third input thereof (in addition to the above mentioned inputs 140 and 141).

The base resistor 188 of transistor 146 may be brought by means of a reversing switch 110 (controlled by a telephonic key AA, FIG. 15) either to the potential $+U_0$ (+4.5 volts) of terminal 110$b$, in the general case where the comparison is continued to the immediately lower order stage (every time equality is found in the stage), or to the potential $-U_0$ of terminal 110$a$, in the case where the operator has decided to produce a separation between the stage that has been considered and the stage of immediately lower order. As a matter of fact, if reversing switch 110 is on terminal 110$a$, the polarity of the base of transistor 146 is such that even if an inequality has occurred in this stage, signals $v_s$ are transmitted, which permits comparison in the immediately following stage. In the system of the comparator according to FIGS. 5 and 8, we provide $n$ devices according to FIG. 11 for comparing number $i_2$ with the lower limit $y^0$ and $n$ devices according to FIG. 11 for comparing number $i_2$ with the upper limit $z^0$ ($z_s$ and $\bar{z}_s$ being introduced by the double switch 135 and 136 into these last mentioned devices). The switches 110 of the same order $s$ for the device serving for comparison with $y^0$ and the device for comparison with $z^0$ are coupled together and simultaneously controlled by means of a telephonic key AA (FIG. 15). It is thus possible, by placing $m$ keys AA, that is to say $m$ double switches 110 (in $m$ stages) into the position applying voltage $-U_0$ through said switches, to divide the whole of the $n$ stages into $m$ parallel channels comprising $n_1, n_2 \ldots n_m$ stages respectively (with the condition $n_1+n_2 \ldots +n_m=n$).

We will now refer to FIGS. 12 and 13 which illustrate the "OR" circuits $U_a$, $U_b$ and $U_c$ of FIG. 8, and also the "NO" circuit V and the gate or "AND" circuit H of said FIG. 8.

The pulses issuing from the "AND" circuits M of comparator E and the pulses issuing from the "AND" circuit N of comparator D are transmitted to a number of elementary "OR" circuits of the type illustrated by FIG. 8. If it is supposed that the conditioning device treats sixteen bits, there will be sixteen times two ouputs of "AND" circuits M or N and in this case use will be made of four "OR" circuits, of the type shown by FIG. 12, with four inputs 156 receiving each the output from a circuit M for some circuits according to FIG. 12 and N for other circuits according to FIG. 12. If the conditioning device treats fifteen bits, an input connected to M and an input connected to N of the "OR" circuits will not be used.

Every element "OR" circuit according to FIG. 12 comprises four NPN transistors 157 (it might comprise a different number thereof), mounted in shunt and connected through the emitters, the collectors being earthed, whereas the bases receive the output signals from circuits M or N. Every transistor 157 is normally blocked and it can be released by a pulse arriving from an M or N circuit through terminal 156. In this case, it delivers current on its output. We will therefore obtain a signal on terminal 158 if at least one terminal 156 is fed with current. In the case where the conditioning device comprises eight systems according to FIG. 12 (as above indicated), the eight outputs 158 are grouped in the circuit of FIG. 13 which comprises four inputs 158a and four inputs 158b, every input 158a being connected to the output 158 of an elementary "OR" circuit according to FIG. 12 receiving the circuit outputs M, whereas every input 158b is connected to the output 158 of an elementary "OR" circuit according to FIG. 12 receiving the outputs of circuits N. The whole of the four circuits according to FIG. 12 and of the four NPN transistors 159 connected in the same manner as the NPN transistors 157 constitutes an "OR" circuit $Ua$ or $Ub$ according to FIG. 12. The output 160 of circuit $Ua$ and the output 161 of circuit $Ub$ are applied to the bases of two NPN transistors 162, 163 connected to constitute an "OR" circuit $Uc$ which delivers current into a "NO" circuit V including a transistor 165. The latter delivers a signal $f_2$ every time the imposed condition has been checked in an "AND" circuit M or N. This signal $f_2$ is applied to one of the inputs of an "AND" circuit H including two transistors 166 and 167 (circuit analogous to the "AND" circuit 120 above described with reference to FIG. 9), the other input of which receives release pulses $j_0$. Finally, the "AND" circuit 166–167 delivers a pulse $h_0$ in case of the simultaneous occurrence of a pulse $j_0$ and of a signal $f_2$. This signal $h_0$ is normally applied (as above explained) to the terminal $m_0$ of FIG. 9 that is connected to the base of transistor 122.

FIG. 14 illustrates an embodiment of the pilot circuit K (FIG. 5). The reference signals or pulses $j_2$, repeated at regular intervals, attack the terminal 168 of the circuit of FIG. 14. They are applied to a threshold device comprising two transistors 169 and 170 coupled through the emitters, which permits of fixing a threshold (at 3 volts ±25% for instance) to avoid the energizing of this circuit by parasitic pulses (of less than 3 volts). The pulses $j_2$ that are thus selected are differentiated by capacitor 170a and resistor 170b before attacking, through a diode 171, a delay trigger circuit 172 consisting of a univibrator with two transistors 173, 174, which is normally in its stable state. The application of a calibrated pulse $j_2$ causes it to switch over into its astable state wherein it remains for a time $t_1$, for instance of four microseconds (supposing that the maximum duration required by the comparator device to make comparisons is of the order of two microseconds, duration $t_1$ depending upon the constants of the circuit of the monostable multivibrator) after which time it returns to its stable state, where it is ready for a new cycle of operation. The negative signal of duration $t_1$ available at 175 is differentiated by capacitor 191 and resistor 192. The positive portion resulting from this differentiation, which corresponds to the rear edge of the signal of duration $t_1$, serves to release a univibrator 176 comprising two transistors 177 and 178 and working substantially in the same manner as univibrator 172 but with a negligible delay. We thus obtain at 179 a calibrated pulse which is amplified in stage 180 including a double emitter-follower 181, 182, to give a release pulse $j_0$ available on terminal $k_0$. This pulse $j_0$ is applied, as above indicated, to the base of the transistor 167 of FIG. 13 and possibly to the terminal $m_0$ of FIG. 9, to control either indirectly or directly the output of every register 111 of intermediate memory A.

The calibrated pulse available at 179 is also applied to a differentiating circuit consisting of a capacitor 183 and a resistor 184. The negative portion of the differentiated signal attacks a transistor 185 which amplifies it. Such an amplified pulse is applied to a double emitter-follower stage, including two transistors 186 and 187, which then supplies at its output $q_0$ a zero resetting pulse $g_2$ adapted to attack at $r_0$ the $n$ input registers $A_s$, to wit a register 111 in every circuit according to FIG. 9, for resetting to zero, at the end of every comparison, these $n$ elementary registers which constitute memory A.

It will be noted, concerning the feeds, that we have shown on the drawings the three necessary feeds, to wit $+u_0$, $-u_0$ and $-2u_0$, voltage $u_0$ being generally equal to 4.5 volts.

The whole of the circuits of the comparator is advantageously mounted on printed cards. It is thus possible to provide:

$n$ cards each including a circuit of the type illustrated by FIG. 9 (for the stages of the 0, 1 . . . $s$, . . ., $n-1$ orders);

$2n$ cards each including a circuit of the type illustrated by FIG. 11, to wit one for the upper limit and one for the lower limit in each of the 0, 1 . . . $s$,..., $n-1$ orders;

A number of cards (for instance four cards if $n=16$ or 15) comprising each a circuit of the type illustrated by FIG. 12;

A card comprising the circuit illustrated by FIG. 13; and

A card comprising the circuit illustrated by FIG. 14.

Finally, FIG. 15 illustrates the front panel 193 of the conditioning device with the different control keys, to wit:

$n$ control keys Y (actuating double switches 135–136, FIG. 9) to introduce the lower limit, bit by bit;

$n$ control keys Z (actuating double switches 135–136, FIG. 9) to introduce the upper limit, bit by bit;

$n$ keys X (actuating switches L, FIG. 9) to control, at the operator's will, either free output (in all cases) under control of pulses $j_0$ or conditioned output (only if the imposed conditions, introduced by keys Y and Z are complied with) under control of pulses $h_0$; and $n-1$ keys AA (actuating the double switches 110 of FIG. 11) to permit of cutting the $n$ stages into several channels. In order to facilitate display of the conditions, keys Y and Z may be of a first color, key X of a second color and keys AA of a third color.

In FIG. 15, we have shown, by way of example, one of the numerous ways of dividing the $n$ stages of the conditioning device into several channels. In this figure, the keys that are lowered are provided with downwardly directed arrows.

The lowering of keys $AA_{87}$ and $AA_{32}$ between the stage of order 8 and 9, on the one hand, and order 3 and 4, on the other hand, determines the variable cuts and therefore divides the conditioning device into parallel channels $VV_1$, $VV_2$ and $VV_3$ of 7, 5 and 3 bits (that is to say 128, 32 and 8 channels) respectively ($n$ is represented as equal to 15).

The lowering of keys $Y_6$ and $Y_1$ sets the upper limits "8" in channel $VV_2$ and "2" in channel $VV_3$, respectively.

The lowering of keys $Z_5$, $Z_4$ and $Z_3$ sets the lower limit "7" in channel $VV_2$, whereas the lowering of key $Z_0$ sets the lower limit "1" channel $VV_1$.

Finally, the fact that the eight keys $X_7$ to $X_0$ of the two channels $VV_2$ and $VV_3$ have not been lowered permits the free output of the informations entering these two channels whereas the lowering of the seven keys $X_{14}$ to $X_8$ of channel $VV_1$ permits the output of the informations entering this channel only if the conditions fixed by the lowering of keys Y and Z (of channels $VV_2$ and $VV_3$ for instance) are complied with. In other words, channels $VV_2$ and $VV_3$ impose respective conditions, whereas channel $VV_1$ is conditioned. We thus obtain the number of informations entering the three channels. For instance, it may be necessary to study the following nuclear phenomenon: we detect two simultaneous radiations characterized by:

The time $tp$ of production,

The detected amplitude $A_v$, supposed to be proportional to the energy $E_v$ of the first radiation, The detected amplitude $A_w$, supposed to be proportional to the energy $E_w$ of the second radiation.

$n_1$ digits (for instance seven digits) of channel $VV_1$ may be applied to the coding of $t_p$.

$n_2$ digits (for instance five digits) may be applied in channel $VV_2$ to the coding of $A_v$.

$n_3$ digits (for instance three digits) may be applied in channel $VV_3$ to the coding of $A_w$.

The conditioning device permits, by fixing conditions for the $A_v$ and $A_w$, of reading in the conditioned channel $VV_1$ the spectrums relative to the $t_p$ as a function of the $A_v$ and $A_w$ ranging within the limits established in the conditioning channels $VV_2$ and $VV_3$.

It will therefore be seen that the quick conditioning device for multidimensional analyzers according to FIGS. 5 to 15 has many advantages among which the following may be cited:

First, it permits of performing very quickly (due to its working in parallel) the checking of one or several conditions imposed on the informations to be treated.

Its operation is very safe and very regular, because it is controlled by piloting or reference signals which distribute in a particularly advantageous manner the different operations in time.

It may consist of transistors and solid diodes, in addition to resistors and capacitors, which ensures a high safety of operation, a long life, reduced weight and volume and the application of low feed voltages.

The comparator, which conditions the output of the coded information stored up in the input intermediate memory, may be placed out of circuit when so desired, by acting upon a series of keys controlling respective switches and in this case we obtain the free delivery of the coded informations contained in said memory.

It permits a quick and easy modification, by means of the control keys acting on the switches, of the condition or conditions which are to be imposed.

It also permits an easy division of its parallel digits into independent channels, either of the same capacity or of different capacities, respectively, and this also by means of the control keys.

In a general manner, while we have in the above description disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. An apparatus for analyzing elementary physical phenomenons, in particular nuclear phenomenons, occurring at irregular intervals, which comprises, in combination, a plurality of removable sub-units each performing a given function for analyzing said phenomenons, to wit:

an input sub-unit for deducing from the succession of said elementary phenomenons a succession of groups of at most $n+1$ simultaneous electrical pulses, every group comprising both a number of at most $n$ digits representing, in binary code, the elementary information corresponding to an elementary phenomenon and a reference supplementary digit associated with said number, a timing sub-unit for distributing at regular time intervals the succession of groups of pulses that issue from said input sub-unit, at least one sub-unit for storing, treating and conditioning groups of pulses issuing at regular intervals from said timing sub-unit, and an output sub-unit for exploiting the elaborated informations delivered by said storing, treating and conditioning sub-units, each of said sub-units, with the exception of the input and output sub-units, comprising, for transmitting the groups of pulses from one sub-unit to another one the following elements:

$n$ input registers for temporarily storing the $n$ pulses of a group representing the number designating every elementary information to be treated in the sub-unit in question, and constituting therefore information pulses, at least one functional device capable of performing, on said $n$ information pulses, the function corresponding to the sub-unit in question, $n$ output devices, each comprising a gate circuit and an impedance transforming circuit, and a pilot device capable, in response to a reference pulse, which represents the reference digit and which comes thereto from the upstream sub-unit at the same time as the $n$ associated information pulses reach the $n$ registers from said upstream sub-unit, of controlling the operation of said at least one functional device, of releasing the gate circuit of said output devices in order to permit transmission to the downstream sub-unit of the group of information pulses, of transmitting toward this downstream sub-unit a reference pulse in synchronism with said group of pulses, and of resetting to zero the $n$ registers at the end of the treatment, in the sub-unit in question, of the information pulses, in order to enable the last mentioned sub-unit to take into charge a new group of information pulses.

2. An apparatus for analyzing elementary physical phenomenons, in particular nuclear phenomenons, occurring at irregular intervals, which comprises, in combination, a plurality of removable sub-units each performing a given function for analyzing said phenomenons, to wit:

an input sub-unit for deducing from the succession of said elementary phenomenons a succession of groups of at most $n+1$ simultaneous electrical pulses, every group comprising both a number of at most $n$ digits representing, in binary code, the elementary information corresponding to an elementary phenomenon and a reference supplementary digit associated with said number, a timing sub-unit for distributing at regular time intervals the succession of groups of pulses that issue from said input sub-unit, at least one sub-unit for storing, treating and/or conditioning groups of pulses issuing at regular intervals from said timing sub-unit, and an output sub-unit for exploiting the elaborated informations delivered by said storing, treating and/or conditioning sub-units, said timing sub-unit having a damping effect capable of acting upon a number of groups of binary digits up to $a$ and comprising the following elements:

a matrix of tunnel diodes and two resistors for each of said diodes such that every diode can be attacked at its input, through said two resistors, by two half-currents, every tunnel diode being arranged to switch over from a first state called "zero" state to a second state called "one" state only if it is attacked simultaneously by two half-currents, said tunnel diodes being grouped to form *a* rows comprising each *n* tunnel diodes, the first half-input of a tunnel diode of every row being connected to receive one of the *n* digits of a group, whereas the second half-inputs of the *n* tunnel diodes of a row are connected in shunt so as to be able simultaneously to receive a pilot pulse which chooses a free row, a first series of transistors comprising a number *a* times *n* of transistors each of which is either conductive or blocked according as the tunnel diode to which it is associated is either in state "one" or in state "zero" respectively, the base of every transistor of this first series being connected with the input of the tunnel diode associated therewith, and a second series of transistors comprising a number *a* times *n* of transistors, the emitter of a transistor of said second series being connected to the collector of a transistor of said first series, whereas the base of the transistors of said second series is connected to receive the reading pulses, the "zero" resetting pulses of the tunnel diodes of the row being applied, after the reading pulses of the same row, to the input of every tunnel diode of this row.

3. An apparatus for analyzing elementary physical phenomenons, in particular nuclear phenomenons, occurring at irregular intervals, which comprises, in combination, a plurality of removable sub-units each performing a given function for analyzing said phenomenons, to wit;

an input sub-unit for deducing from the succession of said elementary phenomenons a succession of groups of at most $n+1$ simultaneous electrical pulses, every group comprising both a number of at most *n* digits representing, in binary code, the elementary information corresponding to an elementary phenomenon and a reference supplementary digit associated with said number, a timing sub-unit for distributing at regular time intervals the succession of groups of pulses that issue from said input sub-unit, at least one sub-unit for storing, treating and/or conditioning groups of pulses issuing at regular intervals from said timing sub-unit, an output sub-unit for exploiting the elaborated informations delivered by said storing, treating and/or conditioning sub-units.

and a quick conditioning device comprising an input intermediate memory intended to receive and to store up in the coded form the successive informations to be checked up to ascertain whether they comply or not with at least one condition, at least one reference memory intended to receive and to store up, also in coded form, at least one limit condition, a comparator device for comparing the coded information contained in said intermediate memory with at least one coded limit condition contained in said reference memory, and supplying a given output signal if this comparison is conform, an output circuit capable of transferring to another unit the coded information contained in said intermediate memory, a conditioning gate for controlling the output of said comparator device, a system of authorization gates for controlling the output of said intermediate memory, these authorization gates being adapted to receive on their control input the output of said conditioning gate, and a pilot device for receiving a succession of reference signals synchronized with the coded informations and for delivering, in response to every reference signal, on the one hand, to a first output connected to the control input of said conditioning gate, a released pulse delayed with respect to this reference signal by a time greater than the maximum duration necessary to said comparator device for performing a complete comparison operation, this pulse serving to release said conditioning gate to enable it to transmit the output signal that may issue from said comparator device, which signal is normally applied to said system of authorization gates to release it in order to permit transfer of the coded information contained in the intermediate memory to the output circuit and, on the other hand, to a second output connected to a zero resetting input of the intermediate memory, a zero resetting pulse delayed, with respect to the corresponding release pulse, by a duration greater than the duration of transfer of the coded information contained in the intermediate memory of the input circuit.

4. An apparatus according to claim 3 wherein the informations to be treated are received, treated and transferred in the parallel pure binary system, the comparator device and the output circuits comprising a number of stages equal to the maximum number of binary orders of an information to be treated.

5. An apparatus according to claim 3 wherein the informations to be treated are received, treated and transferred in the parallel pure binary system, the comparator device and the output circuits comprising a number of stages equal to the maximum number of binary orders of an information to be treated, said comparator device being arranged to compare, for decreasing binary orders, the coded information in said intermediate memory with at least one coded condition contained in said reference memory, further comprising means for blocking the binary orders lower than a binary order where an inequality has been detected by said comparator device.

6. An apparatus according to claim 5 wherein, in order to divide the comparator device into several channels, said blocking means are adapted to be made inoperative between some given stages.

7. An apparatus according to claim 3 wherein said intermediate memory comprises a series of registers each consisting of a bistable element having a first input adapted to receive successively the coded informations and a second input adapted to receive zero resetting pulses from said pilot device.

8. An apparatus according to claim 3 wherein every reference memory comprises, in every stage, a double switch adapted to take two positions, one of these positions corresponding to binary number "1" and the other to binary number "0" to be displayed in said stage, one of the double switch elements displaying the binary number of the limit condition whereas the other element of the double switch displays the complement of this number, means associated with said intermediate memory for deducing from every binary number recorded in said intermediate memory the complement thereof, said comparator devices being adapted to perform the "exclusive OR" logical operation between every coded information and every limit condition, effecting the "AND" logical operations between every digit of the coded information and every complement of the order digit corresponding to a limit condition on the one hand and between every complement of the coded information digit and in the corresponding digit of the limit condition, on the other hand, then an "inclusive OR" operation between the results of the two above mentioned "AND" operations, finally a reversing operation on the result of the "inclusive OR" operation, these different "AND," "inclusive OR" and reversing logical operations being performed successively for decreasing binary orders.

References Cited

UNITED STATES PATENTS 3,142,820   7/1964   Daniels _____ 340—172.5

ROBERT C. BAILEY, *Primary Examiner.*

R. ZACHE, *Assistant Examiner.*